(12) United States Patent
Muth et al.

(10) Patent No.: US 10,133,511 B2
(45) Date of Patent: Nov. 20, 2018

(54) OPTIMIZED SEGMENT CLEANING TECHNIQUE

(71) Applicant: NetApp, Inc., Sunnyvale, CA (US)

(72) Inventors: John Muth, Scotts Valley, CA (US); Edward D. McClanahan, Danville, CA (US); Dhaval Patel, Sunnyvale, CA (US); Manish Swaminathan, Fremont, CA (US)

(73) Assignee: NetApp, Inc, Sunnyvale, CA (US)

( * ) Notice: Subject to any disclaimer, the term of this patent is extended or adjusted under 35 U.S.C. 154(b) by 276 days.

(21) Appl. No.: 14/484,820

(22) Filed: Sep. 12, 2014

(65) Prior Publication Data

US 2016/0077746 A1   Mar. 17, 2016

(51) Int. Cl.
*G06F 3/06* (2006.01)

(52) U.S. Cl.
CPC ............ *G06F 3/0652* (2013.01); *G06F 3/061* (2013.01); *G06F 3/0608* (2013.01);
(Continued)

(58) Field of Classification Search
USPC ........................................................ 711/159
See application file for complete search history.

(56) References Cited

U.S. PATENT DOCUMENTS

| | | |
|---|---|---|
| 5,138,697 A | 8/1992 | Yamamoto et al. |
| 5,375,216 A | 12/1994 | Moyer et al. |

(Continued)

FOREIGN PATENT DOCUMENTS

| | | |
|---|---|---|
| EP | 07265210 A2 | 8/1996 |
| EP | 1970821 A1 | 9/2008 |

(Continued)

OTHER PUBLICATIONS

PCT Notification of Transmittal of the International Search Report and the Written Opinion of the International Searching Authority, or the Declaration, International Searching Authority, International Application No. PCT/US2015/048833, dated Nov. 25, 2015, 11 pages.

(Continued)

*Primary Examiner* — Sean D Rossiter
*Assistant Examiner* — Charles J Choi
(74) *Attorney, Agent, or Firm* — Cesari and McKenna, LLP

(57) ABSTRACT

An optimized segment cleaning technique is configured to efficiently clean one or more selected portions or segments of a storage array coupled to one or more nodes of a cluster. A bottom-up approach of the segment cleaning technique is configured to read all blocks of a segment to be cleaned (i.e., an "old" segment) to locate extents stored on the SSDs of the old segment and examine extent metadata to determine whether the extents are valid and, if so, relocate the valid extents to a segment being written (i.e., a "new" segment). A top-down approach of the segment cleaning technique obviates reading of the blocks of the old segment to locate the extents and, instead, examines the extent metadata to determine the valid extents of the old segment. A hybrid approach may extend the top-down approach to include only full stripe read operations needed for relocation and reconstruction of blocks as well as retrieval of valid extents from the stripes, while also avoiding any unnecessary read operations of the bottom-down approach.

20 Claims, 10 Drawing Sheets

(52) U.S. Cl.
CPC .......... *G06F 3/0644* (2013.01); *G06F 3/0673* (2013.01); *G06F 3/0688* (2013.01); *G06F 2212/7205* (2013.01)

(56) References Cited

U.S. PATENT DOCUMENTS

| | | | |
|---|---|---|---|
| 5,459,857 A | 10/1995 | Ludlam et al. |
| 5,511,190 A | 4/1996 | Sharma et al. |
| 5,603,001 A | 2/1997 | Sukegawa et al. |
| 5,734,898 A | 3/1998 | He |
| 5,860,082 A | 1/1999 | Smith et al. |
| 5,890,161 A | 3/1999 | Helland et al. |
| 5,937,425 A | 8/1999 | Ban |
| 5,991,862 A | 11/1999 | Ruane |
| 6,081,900 A | 6/2000 | Subramaniam et al. |
| 6,219,800 B1 | 4/2001 | Johnson et al. |
| 6,257,756 B1 | 7/2001 | Zarubinsky et al. |
| 6,275,898 B1 | 8/2001 | Dekoning |
| 6,347,337 B1 | 2/2002 | Shah et al. |
| 6,363,385 B1 | 3/2002 | Kedem et al. |
| 6,397,307 B2 | 5/2002 | Ohran |
| 6,434,555 B1 | 8/2002 | Frolund et al. |
| 6,434,662 B1 | 8/2002 | Greene et al. |
| 6,526,478 B1 | 2/2003 | Kirby |
| 6,553,384 B1 | 4/2003 | Frey et al. |
| 6,560,196 B1 | 5/2003 | Wei |
| 6,578,158 B1 | 6/2003 | Deitz et al. |
| 6,604,155 B1 | 8/2003 | Chong, Jr. |
| 6,609,176 B1 | 8/2003 | Mizuno |
| 6,704,839 B2 | 3/2004 | Butterworth et al. |
| 6,728,843 B1 | 4/2004 | Pong et al. |
| 6,741,698 B1 | 5/2004 | Jensen |
| 6,779,003 B1 | 8/2004 | Midgley et al. |
| 6,895,500 B1 | 5/2005 | Rothberg |
| 6,904,470 B1 | 6/2005 | Ofer et al. |
| 6,912,645 B2 | 6/2005 | Dorward et al. |
| 6,917,898 B1 | 7/2005 | Kirubalaratnam et al. |
| 6,928,521 B1 | 8/2005 | Burton et al. |
| 6,928,526 B1 | 8/2005 | Zhu et al. |
| 7,003,565 B2 | 2/2006 | Hind et al. |
| 7,039,694 B2 | 5/2006 | Kampe et al. |
| 7,047,358 B2 | 5/2006 | Lee et al. |
| 7,055,058 B2 | 5/2006 | Lee et al. |
| 7,065,619 B1 | 6/2006 | Zhu et al. |
| 7,093,086 B1 | 8/2006 | van Rietschote |
| 7,110,913 B2 | 9/2006 | Monroe et al. |
| 7,152,142 B1 | 12/2006 | Guha et al. |
| 7,167,951 B2 | 1/2007 | Blades et al. |
| 7,174,379 B2 | 2/2007 | Agarwal et al. |
| 7,188,149 B2 | 3/2007 | Kishimoto et al. |
| 7,191,357 B2 | 3/2007 | Holland et al. |
| 7,219,260 B1 | 5/2007 | de Forest et al. |
| 7,249,150 B1 | 7/2007 | Watanabe et al. |
| 7,251,663 B1 | 7/2007 | Smith |
| 7,257,690 B1 | 8/2007 | Baird |
| 7,305,579 B2 | 12/2007 | Williams |
| 7,325,059 B2 | 1/2008 | Barach et al. |
| 7,334,094 B2 | 2/2008 | Fair |
| 7,334,095 B1 | 2/2008 | Fair et al. |
| 7,366,865 B2 | 4/2008 | Lakshmanamurthy et al. |
| 7,370,048 B2 | 5/2008 | Loeb |
| 7,373,345 B2 | 5/2008 | Carpentier et al. |
| 7,394,944 B2 | 7/2008 | Boskovic et al. |
| 7,395,283 B1 | 7/2008 | Atzmony et al. |
| 7,395,352 B1 | 7/2008 | Lam et al. |
| 7,415,653 B1 | 8/2008 | Bonwick et al. |
| 7,451,167 B2 | 11/2008 | Bali et al. |
| 7,454,592 B1 | 11/2008 | Shah et al. |
| 7,457,864 B2 | 11/2008 | Chambliss et al. |
| 7,464,125 B1 | 12/2008 | Orszag et al. |
| 7,519,725 B2 | 4/2009 | Alvarez et al. |
| 7,526,685 B2 | 4/2009 | Maso et al. |
| 7,529,780 B1 | 5/2009 | Braginsky et al. |
| 7,529,830 B2 | 5/2009 | Fujii |
| 7,543,100 B2 | 6/2009 | Singhal et al. |
| 7,543,178 B2 | 6/2009 | McNeill et al. |
| 7,562,101 B1 | 7/2009 | Jernigan, IV et al. |
| 7,562,203 B2 | 7/2009 | Scott et al. |
| 7,603,391 B1 | 10/2009 | Federwisch et al. |
| 7,603,529 B1 | 10/2009 | MacHardy et al. |
| 7,624,112 B2 | 11/2009 | Ganesh et al. |
| 7,644,087 B2 | 1/2010 | Barkai et al. |
| 7,668,885 B2 | 2/2010 | Wittke et al. |
| 7,680,837 B2 | 3/2010 | Yamato |
| 7,681,076 B1 | 3/2010 | Sarma |
| 7,689,716 B2 | 3/2010 | Short et al. |
| 7,701,948 B2 | 4/2010 | Rabje et al. |
| 7,730,153 B1 | 6/2010 | Gole et al. |
| 7,739,614 B1 | 6/2010 | Hackworth |
| 7,743,035 B2 | 6/2010 | Chen et al. |
| 7,757,056 B1 | 7/2010 | Fair |
| 7,797,279 B1 | 9/2010 | Starling et al. |
| 7,805,266 B1 | 9/2010 | Dasu et al. |
| 7,805,583 B1 | 9/2010 | Todd et al. |
| 7,814,064 B2 | 10/2010 | Vingralek |
| 7,817,562 B1 | 10/2010 | Kemeny |
| 7,818,525 B1 | 10/2010 | Frost et al. |
| 7,831,769 B1 | 11/2010 | Wen et al. |
| 7,849,098 B1 | 12/2010 | Scales et al. |
| 7,873,619 B1 | 1/2011 | Faibish et al. |
| 7,899,791 B1 | 3/2011 | Gole |
| 7,917,726 B2 | 3/2011 | Hummel et al. |
| 7,921,169 B2 | 4/2011 | Jacobs et al. |
| 7,949,693 B1 | 5/2011 | Mason et al. |
| 7,962,709 B2 | 6/2011 | Agrawal |
| 7,987,167 B1 | 7/2011 | Kazar et al. |
| 7,996,636 B1 | 8/2011 | Prakash et al. |
| 8,055,745 B2 | 11/2011 | Atluri |
| 8,060,797 B2 | 11/2011 | Hida et al. |
| 8,074,019 B2 | 12/2011 | Gupta et al. |
| 8,078,918 B2 | 12/2011 | Diggs et al. |
| 8,082,390 B1 | 12/2011 | Fan et al. |
| 8,086,585 B1 | 12/2011 | Brashers et al. |
| 8,089,969 B2 | 1/2012 | Rabie et al. |
| 8,090,908 B1 | 1/2012 | Bolen et al. |
| 8,099,396 B1 | 1/2012 | Novick et al. |
| 8,099,554 B1 | 1/2012 | Solomon et al. |
| 8,122,213 B2 | 2/2012 | Cherian et al. |
| 8,127,182 B2 | 2/2012 | Sivaperuman et al. |
| 8,131,926 B2 | 3/2012 | Lubbers et al. |
| 8,140,821 B1 | 3/2012 | Raizen et al. |
| 8,140,860 B2 | 3/2012 | Haswell |
| 8,156,016 B2 | 4/2012 | Zhang |
| 8,156,290 B1 | 4/2012 | Vanninen et al. |
| 8,156,306 B1 | 4/2012 | Raizen et al. |
| 8,184,807 B2 | 5/2012 | Kato et al. |
| 8,205,065 B2 | 6/2012 | Matze |
| 8,209,587 B1 | 6/2012 | Taylor et al. |
| 8,214,868 B2 | 7/2012 | Hamilton et al. |
| 8,224,935 B1 | 7/2012 | Bandopadhyay et al. |
| 8,244,978 B2 | 8/2012 | Kegel et al. |
| 8,250,116 B2 | 8/2012 | Mazzagatti et al. |
| 8,261,085 B1 | 9/2012 | Fernando Gutierrez |
| 8,312,231 B1 | 11/2012 | Li et al. |
| 8,327,103 B1 | 12/2012 | Can et al. |
| 8,341,457 B2 | 12/2012 | Spry et al. |
| 8,369,217 B2 | 2/2013 | Bostica et al. |
| 8,417,987 B1 | 4/2013 | Goel et al. |
| 8,429,282 B1 | 4/2013 | Ahuja et al. |
| 8,452,929 B2 | 5/2013 | Bennett |
| 8,463,825 B1 | 6/2013 | Harty et al. |
| 8,468,368 B2 | 6/2013 | Gladwin et al. |
| 8,489,811 B1 | 7/2013 | Corbett et al. |
| 8,495,417 B2 | 7/2013 | Jernigan, IV et al. |
| 8,520,855 B1 | 8/2013 | Kohno et al. |
| 8,539,008 B2 | 9/2013 | Faith et al. |
| 8,543,611 B1 | 9/2013 | Mirtich et al. |
| 8,549,154 B2 | 10/2013 | Colrain et al. |
| 8,555,019 B2 | 10/2013 | Montgomery et al. |
| 8,560,879 B1 | 10/2013 | Goel |
| 8,566,617 B1 | 10/2013 | Clifford |
| 8,583,865 B1 | 11/2013 | Sade et al. |
| 8,589,625 B2 | 11/2013 | Colgrove et al. |
| 8,595,434 B2 | 11/2013 | Northcutt et al. |

(56) References Cited

U.S. PATENT DOCUMENTS

| | | |
|---|---|---|
| 8,595,595 B1 | 11/2013 | Grcanac et al. |
| 8,600,949 B2 | 12/2013 | Periyagaram et al. |
| 8,645,664 B1 | 2/2014 | Colgrove et al. |
| 8,645,698 B2 | 2/2014 | Yi et al. |
| 8,671,265 B2 | 3/2014 | Wright |
| 8,706,701 B1 | 4/2014 | Stefanov et al. |
| 8,712,963 B1 | 4/2014 | Douglis et al. |
| 8,732,426 B2 | 5/2014 | Colgrove et al. |
| 8,745,338 B1 | 6/2014 | Yadav et al. |
| 8,751,763 B1 | 6/2014 | Ramarao |
| 8,762,654 B1 | 6/2014 | Yang et al. |
| 8,775,868 B2 | 7/2014 | Colgrove et al. |
| 8,782,439 B2 | 7/2014 | Resch |
| 8,787,580 B2 | 7/2014 | Hodges et al. |
| 8,799,571 B1 | 8/2014 | Desroches et al. |
| 8,799,705 B2 | 8/2014 | Hallak et al. |
| 8,806,115 B1 | 8/2014 | Patel et al. |
| 8,806,160 B2 | 8/2014 | Colgrove et al. |
| 8,812,450 B1 | 8/2014 | Kesavan et al. |
| 8,824,686 B1 | 9/2014 | Ishii et al. |
| 8,832,363 B1 | 9/2014 | Sundaram et al. |
| 8,832,373 B2 | 9/2014 | Colgrove et al. |
| 8,839,008 B2 | 9/2014 | Maniktala |
| 8,843,711 B1 | 9/2014 | Yadav et al. |
| 8,850,108 B1 | 9/2014 | Hayes et al. |
| 8,850,216 B1 | 9/2014 | Mikhailov et al. |
| 8,855,318 B1 | 10/2014 | Patnala et al. |
| 8,856,593 B2 | 10/2014 | Eckhardt et al. |
| 8,868,868 B1 | 10/2014 | Maheshwari et al. |
| 8,874,842 B1 | 10/2014 | Kimmel et al. |
| 8,880,787 B1 | 11/2014 | Kimmel et al. |
| 8,892,818 B1 | 11/2014 | Zheng et al. |
| 8,904,137 B1 | 12/2014 | Zhang et al. |
| 8,904,231 B2 | 12/2014 | Coatney et al. |
| 8,922,928 B2 | 12/2014 | Powell |
| 8,930,778 B2 | 1/2015 | Cohen |
| 8,943,032 B1 | 1/2015 | Xu et al. |
| 8,943,282 B1 | 1/2015 | Armangau et al. |
| 8,949,568 B2 | 2/2015 | Wei et al. |
| 8,977,781 B1 | 3/2015 | Yokoi et al. |
| 8,996,468 B1 | 3/2015 | Mattox |
| 8,996,535 B1 | 3/2015 | Kimmel et al. |
| 8,996,790 B1 | 3/2015 | Segal et al. |
| 8,996,797 B1 | 3/2015 | Zheng et al. |
| 9,003,162 B2 | 4/2015 | Lomet et al. |
| 9,009,449 B2 | 4/2015 | Chou et al. |
| 9,021,303 B1 | 4/2015 | Desouter et al. |
| 9,037,544 B1 | 5/2015 | Zheng et al. |
| 9,047,211 B2 | 6/2015 | Wood et al. |
| 9,058,119 B1 | 6/2015 | Ray, III et al. |
| 9,092,142 B2 | 7/2015 | Nashimoto et al. |
| 9,152,684 B2 | 10/2015 | Zheng et al. |
| 9,195,939 B1 | 11/2015 | Goyal et al. |
| 9,201,742 B2 | 12/2015 | Bulkowski et al. |
| 9,225,801 B1 | 12/2015 | McMullen et al. |
| 9,229,642 B2 | 1/2016 | Shu et al. |
| 9,256,549 B2 | 2/2016 | Kimmel et al. |
| 9,268,502 B2 | 2/2016 | Zheng et al. |
| 9,298,417 B1 | 3/2016 | Muddu et al. |
| 9,367,241 B2 | 6/2016 | Sundaram et al. |
| 9,378,043 B1 | 6/2016 | Zhang et al. |
| 9,389,958 B2 | 7/2016 | Sundaram et al. |
| 9,405,783 B2 | 8/2016 | Kimmel et al. |
| 9,411,620 B2 | 8/2016 | Wang et al. |
| 9,413,680 B1 | 8/2016 | Kusters et al. |
| 9,459,856 B2 | 10/2016 | Curzi et al. |
| 9,460,009 B1 | 10/2016 | Taylor et al. |
| 9,471,680 B2 | 10/2016 | Elsner et al. |
| 9,537,827 B1 | 1/2017 | McMullen et al. |
| 9,639,546 B1 | 5/2017 | Gorski et al. |
| 9,652,405 B1 | 5/2017 | Shain et al. |
| 2002/0042693 A1 | 4/2002 | Kampe et al. |
| 2002/0073068 A1 | 6/2002 | Guha |
| 2002/0073354 A1 | 6/2002 | Schroiff et al. |
| 2002/0091897 A1 | 7/2002 | Chiu et al. |
| 2002/0116569 A1 | 8/2002 | Kim et al. |
| 2002/0156891 A1 | 10/2002 | Ulrich et al. |
| 2002/0174419 A1 | 11/2002 | Alvarez et al. |
| 2002/0188711 A1 | 12/2002 | Meyer et al. |
| 2003/0005147 A1 | 1/2003 | Enns et al. |
| 2003/0105928 A1 | 6/2003 | Ash et al. |
| 2003/0115204 A1 | 6/2003 | Greenblatt et al. |
| 2003/0115282 A1 | 6/2003 | Rose |
| 2003/0120869 A1 | 7/2003 | Lee et al. |
| 2003/0126118 A1 | 7/2003 | Burton et al. |
| 2003/0126143 A1 | 7/2003 | Roussopoulos et al. |
| 2003/0135729 A1 | 7/2003 | Mason et al. |
| 2003/0159007 A1 | 8/2003 | Sawdon et al. |
| 2003/0163628 A1 | 8/2003 | Lin et al. |
| 2003/0172059 A1 | 9/2003 | Andrei |
| 2003/0191916 A1 | 10/2003 | McBrearty et al. |
| 2003/0195895 A1 | 10/2003 | Nowicki et al. |
| 2003/0200388 A1 | 10/2003 | Hetrick |
| 2003/0212872 A1 | 11/2003 | Patterson et al. |
| 2003/0223445 A1 | 12/2003 | Lodha |
| 2004/0003173 A1 | 1/2004 | Yao et al. |
| 2004/0030703 A1 | 2/2004 | Bourbonnais et al. |
| 2004/0052254 A1 | 3/2004 | Hooper |
| 2004/0054656 A1 | 3/2004 | Leung et al. |
| 2004/0107281 A1 | 6/2004 | Bose et al. |
| 2004/0133590 A1 | 7/2004 | Henderson et al. |
| 2004/0133622 A1 | 7/2004 | Clubb et al. |
| 2004/0133742 A1 | 7/2004 | Vasudevan et al. |
| 2004/0153544 A1 | 8/2004 | Kelliher et al. |
| 2004/0153863 A1 | 8/2004 | Klotz et al. |
| 2004/0158549 A1 | 8/2004 | Matena et al. |
| 2004/0186858 A1 | 9/2004 | McGovern et al. |
| 2004/0205166 A1 | 10/2004 | Demoney |
| 2004/0215792 A1 | 10/2004 | Koning et al. |
| 2004/0236846 A1 | 11/2004 | Alvarez et al. |
| 2004/0267932 A1 | 12/2004 | Voellm et al. |
| 2005/0027817 A1 | 2/2005 | Novik et al. |
| 2005/0039156 A1 | 2/2005 | Catthoor et al. |
| 2005/0043834 A1 | 2/2005 | Rotariu et al. |
| 2005/0044244 A1 | 2/2005 | Warwick et al. |
| 2005/0076113 A1 | 4/2005 | Klotz et al. |
| 2005/0076115 A1 | 4/2005 | Andrews et al. |
| 2005/0080923 A1 | 4/2005 | Elzur |
| 2005/0091261 A1 | 4/2005 | Wu et al. |
| 2005/0108472 A1 | 5/2005 | Kanai et al. |
| 2005/0119996 A1 | 6/2005 | Ohata et al. |
| 2005/0128951 A1 | 6/2005 | Chawla et al. |
| 2005/0144514 A1 | 6/2005 | Ulrich et al. |
| 2005/0177770 A1 | 8/2005 | Coatney et al. |
| 2005/0203930 A1 | 9/2005 | Bukowski et al. |
| 2005/0228885 A1 | 10/2005 | Winfield et al. |
| 2005/0246362 A1 | 11/2005 | Borland |
| 2005/0246398 A1 | 11/2005 | Barzilai et al. |
| 2006/0004957 A1 | 1/2006 | Hand, III |
| 2006/0071845 A1 | 4/2006 | Stroili et al. |
| 2006/0072555 A1 | 4/2006 | St. Hilaire et al. |
| 2006/0072593 A1 | 4/2006 | Grippo et al. |
| 2006/0074977 A1 | 4/2006 | Kothuri et al. |
| 2006/0085166 A1 | 4/2006 | Ochi et al. |
| 2006/0101091 A1 | 5/2006 | Carbajales et al. |
| 2006/0112155 A1 | 5/2006 | Earl et al. |
| 2006/0129676 A1 | 6/2006 | Modi et al. |
| 2006/0136718 A1 | 6/2006 | Moreillon |
| 2006/0156059 A1 | 7/2006 | Kitamura |
| 2006/0165074 A1 | 7/2006 | Modi et al. |
| 2006/0206671 A1 | 9/2006 | Aiello et al. |
| 2006/0232826 A1 | 10/2006 | Bar-El |
| 2006/0282662 A1 | 12/2006 | Whitcomb |
| 2006/0288151 A1 | 12/2006 | McKenney |
| 2007/0016617 A1 | 1/2007 | Lomet |
| 2007/0033433 A1 | 2/2007 | Pecone et al. |
| 2007/0061572 A1 | 3/2007 | Imai et al. |
| 2007/0064604 A1 | 3/2007 | Chen et al. |
| 2007/0083482 A1 | 4/2007 | Rathi et al. |
| 2007/0083722 A1 | 4/2007 | Per et al. |
| 2007/0088702 A1 | 4/2007 | Fridella et al. |
| 2007/0094452 A1 | 4/2007 | Fachan |
| 2007/0112723 A1 | 5/2007 | Alvarez et al. |
| 2007/0112955 A1 | 5/2007 | Clemm et al. |

(56) References Cited

U.S. PATENT DOCUMENTS

| | | | |
|---|---|---|---|
| 2007/0136269 A1 | 6/2007 | Yamakabe et al. |
| 2007/0143359 A1 | 6/2007 | Uppala |
| 2007/0186066 A1 | 8/2007 | Desai et al. |
| 2007/0186127 A1 | 8/2007 | Desai et al. |
| 2007/0208537 A1 | 9/2007 | Savoor et al. |
| 2007/0208918 A1 | 9/2007 | Harbin et al. |
| 2007/0234106 A1 | 10/2007 | Lecrone et al. |
| 2007/0245041 A1 | 10/2007 | Hua et al. |
| 2007/0255530 A1 | 11/2007 | Wolff |
| 2007/0266037 A1 | 11/2007 | Terry et al. |
| 2007/0300013 A1 | 12/2007 | Kitamura |
| 2008/0065639 A1 | 3/2008 | Choudhary et al. |
| 2008/0071939 A1 | 3/2008 | Tanaka et al. |
| 2008/0104264 A1 | 5/2008 | Duerk et al. |
| 2008/0126695 A1 | 5/2008 | Berg |
| 2008/0127211 A1 | 5/2008 | Belsey et al. |
| 2008/0155190 A1 | 6/2008 | Ash et al. |
| 2008/0162990 A1 | 7/2008 | Wang et al. |
| 2008/0165899 A1 | 7/2008 | Rahman et al. |
| 2008/0184063 A1 | 7/2008 | Abdulvahid |
| 2008/0201535 A1 | 8/2008 | Hara |
| 2008/0244158 A1 | 10/2008 | Funatsu et al. |
| 2008/0244354 A1 | 10/2008 | Wu et al. |
| 2008/0250270 A1 | 10/2008 | Bennett |
| 2008/0270719 A1 | 10/2008 | Cochran et al. |
| 2009/0019449 A1 | 1/2009 | Choi et al. |
| 2009/0031083 A1 | 1/2009 | Willis et al. |
| 2009/0037500 A1 | 2/2009 | Kirshenbaum |
| 2009/0037654 A1 | 2/2009 | Allison et al. |
| 2009/0043878 A1 | 2/2009 | Ni |
| 2009/0083478 A1 | 3/2009 | Kunimatsu et al. |
| 2009/0097654 A1 | 4/2009 | Blake |
| 2009/0132770 A1 | 5/2009 | Lin et al. |
| 2009/0144497 A1 | 6/2009 | Withers |
| 2009/0150537 A1 | 6/2009 | Fanson |
| 2009/0157870 A1 | 6/2009 | Nakadai |
| 2009/0210611 A1 | 8/2009 | Mizushima |
| 2009/0210618 A1 | 8/2009 | Bates et al. |
| 2009/0225657 A1 | 9/2009 | Haggar et al. |
| 2009/0235022 A1 | 9/2009 | Bates et al. |
| 2009/0271412 A1 | 10/2009 | Lacapra et al. |
| 2009/0276567 A1* | 11/2009 | Burkey ............... G06F 11/2061 711/114 |
| 2009/0285476 A1 | 11/2009 | Choe et al. |
| 2009/0307290 A1 | 12/2009 | Barsness et al. |
| 2009/0313503 A1 | 12/2009 | Atluri et al. |
| 2010/0011037 A1 | 1/2010 | Kazar |
| 2010/0023726 A1 | 1/2010 | Aviles |
| 2010/0030981 A1 | 2/2010 | Cook |
| 2010/0031000 A1 | 2/2010 | Flynn et al. |
| 2010/0031315 A1 | 2/2010 | Feng et al. |
| 2010/0042790 A1 | 2/2010 | Mondal et al. |
| 2010/0057792 A1 | 3/2010 | Ylonen |
| 2010/0070701 A1 | 3/2010 | Iyigun et al. |
| 2010/0077380 A1 | 3/2010 | Baker et al. |
| 2010/0082648 A1 | 4/2010 | Potapov et al. |
| 2010/0082790 A1 | 4/2010 | Hussaini et al. |
| 2010/0088296 A1 | 4/2010 | Periyagaram et al. |
| 2010/0122148 A1 | 5/2010 | Flynn et al. |
| 2010/0161569 A1 | 6/2010 | Schreter |
| 2010/0161850 A1 | 6/2010 | Otsuka |
| 2010/0169415 A1 | 7/2010 | Leggette et al. |
| 2010/0174677 A1 | 7/2010 | Zahavi et al. |
| 2010/0174714 A1 | 7/2010 | Asmundsson et al. |
| 2010/0191713 A1 | 7/2010 | Lomet et al. |
| 2010/0199009 A1 | 8/2010 | Koide |
| 2010/0199040 A1 | 8/2010 | Schnapp et al. |
| 2010/0205353 A1 | 8/2010 | Miyamoto et al. |
| 2010/0205390 A1 | 8/2010 | Arakawa |
| 2010/0223385 A1 | 9/2010 | Gulley et al. |
| 2010/0228795 A1 | 9/2010 | Hahn et al. |
| 2010/0228999 A1 | 9/2010 | Maheshwari et al. |
| 2010/0250497 A1 | 9/2010 | Redlich et al. |
| 2010/0250712 A1 | 9/2010 | Ellison et al. |
| 2010/0262812 A1 | 10/2010 | Lopez et al. |
| 2010/0268983 A1 | 10/2010 | Raghunandan |
| 2010/0280998 A1 | 11/2010 | Goebel et al. |
| 2010/0281080 A1 | 11/2010 | Rajaram et al. |
| 2010/0293147 A1 | 11/2010 | Snow et al. |
| 2010/0306468 A1 | 12/2010 | Shionoya |
| 2010/0309933 A1 | 12/2010 | Stark et al. |
| 2011/0004707 A1 | 1/2011 | Spry et al. |
| 2011/0022778 A1 | 1/2011 | Schibilla et al. |
| 2011/0035548 A1* | 2/2011 | Kimmel ............... G06F 3/061 711/114 |
| 2011/0060876 A1 | 3/2011 | Liu |
| 2011/0066808 A1 | 3/2011 | Flynn et al. |
| 2011/0072008 A1 | 3/2011 | Mandal et al. |
| 2011/0078496 A1 | 3/2011 | Jeddeloh |
| 2011/0087929 A1 | 4/2011 | Koshiyama |
| 2011/0093674 A1 | 4/2011 | Frame et al. |
| 2011/0099342 A1 | 4/2011 | Ozdemir |
| 2011/0099419 A1 | 4/2011 | Lucas et al. |
| 2011/0126045 A1 | 5/2011 | Bennett |
| 2011/0153603 A1 | 6/2011 | Adiba et al. |
| 2011/0153719 A1 | 6/2011 | Santoro et al. |
| 2011/0153972 A1 | 6/2011 | Laberge |
| 2011/0154103 A1 | 6/2011 | Bulusu et al. |
| 2011/0161293 A1 | 6/2011 | Vermeulen et al. |
| 2011/0161725 A1 | 6/2011 | Allen et al. |
| 2011/0191389 A1 | 8/2011 | Okamoto |
| 2011/0191522 A1 | 8/2011 | Condict et al. |
| 2011/0213928 A1 | 9/2011 | Grube et al. |
| 2011/0219106 A1 | 9/2011 | Wright |
| 2011/0238857 A1 | 9/2011 | Certain et al. |
| 2011/0246733 A1 | 10/2011 | Usgaonkar et al. |
| 2011/0246821 A1* | 10/2011 | Eleftheriou ......... G06F 11/2087 714/15 |
| 2011/0283048 A1 | 11/2011 | Feldman et al. |
| 2011/0289565 A1 | 11/2011 | Resch et al. |
| 2011/0296133 A1 | 12/2011 | Flynn et al. |
| 2011/0307530 A1 | 12/2011 | Patterson |
| 2011/0311051 A1 | 12/2011 | Resch et al. |
| 2011/0314346 A1 | 12/2011 | Vas et al. |
| 2012/0003940 A1 | 1/2012 | Hirano et al. |
| 2012/0011176 A1 | 1/2012 | Aizman |
| 2012/0011340 A1 | 1/2012 | Flynn et al. |
| 2012/0011398 A1 | 1/2012 | Eckhardt et al. |
| 2012/0016840 A1 | 1/2012 | Lin et al. |
| 2012/0047115 A1 | 2/2012 | Subramanya et al. |
| 2012/0054746 A1 | 3/2012 | Vaghani et al. |
| 2012/0063306 A1 | 3/2012 | Sultan et al. |
| 2012/0072656 A1 | 3/2012 | Archak et al. |
| 2012/0072680 A1 | 3/2012 | Kimura et al. |
| 2012/0078856 A1 | 3/2012 | Linde |
| 2012/0079318 A1 | 3/2012 | Colgrove et al. |
| 2012/0084506 A1 | 4/2012 | Colgrove et al. |
| 2012/0109895 A1 | 5/2012 | Zwilling et al. |
| 2012/0124282 A1 | 5/2012 | Frank et al. |
| 2012/0136834 A1 | 5/2012 | Zhao |
| 2012/0143877 A1 | 6/2012 | Kumar et al. |
| 2012/0150869 A1 | 6/2012 | Wang et al. |
| 2012/0150930 A1 | 6/2012 | Jin et al. |
| 2012/0151118 A1 | 6/2012 | Flynn et al. |
| 2012/0166715 A1 | 6/2012 | Frost et al. |
| 2012/0166749 A1* | 6/2012 | Eleftheriou ............ G06F 3/0616 711/165 |
| 2012/0185437 A1 | 7/2012 | Pavlov et al. |
| 2012/0197844 A1 | 8/2012 | Wang et al. |
| 2012/0221828 A1 | 8/2012 | Fang et al. |
| 2012/0226841 A1 | 9/2012 | Nguyen et al. |
| 2012/0239869 A1 | 9/2012 | Chiueh et al. |
| 2012/0243687 A1 | 9/2012 | Li et al. |
| 2012/0246129 A1 | 9/2012 | Rothschild et al. |
| 2012/0246392 A1 | 9/2012 | Cheon |
| 2012/0271868 A1 | 10/2012 | Fukatani et al. |
| 2012/0290629 A1 | 11/2012 | Beaverson et al. |
| 2012/0290788 A1 | 11/2012 | Klemm et al. |
| 2012/0303876 A1 | 11/2012 | Benhase et al. |
| 2012/0310890 A1 | 12/2012 | Dodd et al. |
| 2012/0311246 A1 | 12/2012 | McWilliams et al. |
| 2012/0311290 A1 | 12/2012 | White |
| 2012/0311568 A1 | 12/2012 | Jansen |
| 2012/0317084 A1 | 12/2012 | Liu |

(56) References Cited

U.S. PATENT DOCUMENTS

| | | |
|---|---|---|
| 2012/0317338 A1 | 12/2012 | Yi et al. |
| 2012/0317353 A1 | 12/2012 | Webman et al. |
| 2012/0317395 A1 | 12/2012 | Segev et al. |
| 2012/0323860 A1 | 12/2012 | Yasa et al. |
| 2012/0324150 A1 | 12/2012 | Moshayedi et al. |
| 2012/0331471 A1 | 12/2012 | Ramalingam et al. |
| 2013/0007097 A1 | 1/2013 | Sambe et al. |
| 2013/0010966 A1 | 1/2013 | Li et al. |
| 2013/0013654 A1 | 1/2013 | Lacapra et al. |
| 2013/0018722 A1 | 1/2013 | Libby |
| 2013/0018854 A1 | 1/2013 | Condict |
| 2013/0019057 A1 | 1/2013 | Stephens |
| 2013/0042065 A1 | 2/2013 | Kasten et al. |
| 2013/0055358 A1 | 2/2013 | Short et al. |
| 2013/0060992 A1 | 3/2013 | Cho et al. |
| 2013/0061169 A1 | 3/2013 | Pearcy et al. |
| 2013/0073519 A1 | 3/2013 | Lewis et al. |
| 2013/0073821 A1 | 3/2013 | Flynn et al. |
| 2013/0080679 A1 | 3/2013 | Bert |
| 2013/0086006 A1 | 4/2013 | Colgrove et al. |
| 2013/0086270 A1 | 4/2013 | Nishikawa et al. |
| 2013/0110783 A1 | 5/2013 | Wertheimer et al. |
| 2013/0110845 A1 | 5/2013 | Dua |
| 2013/0111374 A1 | 5/2013 | Hamilton et al. |
| 2013/0124776 A1 | 5/2013 | Hallak et al. |
| 2013/0138616 A1 | 5/2013 | Gupta et al. |
| 2013/0138862 A1 | 5/2013 | Motwani et al. |
| 2013/0148504 A1 | 6/2013 | Ungureanu |
| 2013/0166724 A1 | 6/2013 | Bairavasundaram et al. |
| 2013/0166727 A1 | 6/2013 | Wright et al. |
| 2013/0166861 A1 | 6/2013 | Takano et al. |
| 2013/0185719 A1 | 7/2013 | Kar et al. |
| 2013/0204902 A1 | 8/2013 | Wang et al. |
| 2013/0219048 A1 | 8/2013 | Arvidsson et al. |
| 2013/0219214 A1 | 8/2013 | Samanta et al. |
| 2013/0226877 A1 | 8/2013 | Nagai et al. |
| 2013/0227111 A1 | 8/2013 | Wright et al. |
| 2013/0227195 A1 | 8/2013 | Beaverson et al. |
| 2013/0227201 A1 | 8/2013 | Talagala et al. |
| 2013/0227236 A1 | 8/2013 | Flynn et al. |
| 2013/0232261 A1 | 9/2013 | Wright et al. |
| 2013/0238832 A1 | 9/2013 | Dronamraju et al. |
| 2013/0238876 A1 | 9/2013 | Fiske et al. |
| 2013/0238932 A1 | 9/2013 | Resch |
| 2013/0262746 A1 | 10/2013 | Srinivasan |
| 2013/0262805 A1 | 10/2013 | Zheng et al. |
| 2013/0268497 A1 | 10/2013 | Baldwin et al. |
| 2013/0275656 A1 | 10/2013 | Talagala et al. |
| 2013/0290249 A1 | 10/2013 | Merriman et al. |
| 2013/0290263 A1 | 10/2013 | Beaverson et al. |
| 2013/0305002 A1 | 11/2013 | Hallak et al. |
| 2013/0311740 A1 | 11/2013 | Watanabe et al. |
| 2013/0332688 A1 | 12/2013 | Corbett et al. |
| 2013/0339629 A1 | 12/2013 | Alexander et al. |
| 2013/0346700 A1 | 12/2013 | Tomlinson et al. |
| 2013/0346720 A1 | 12/2013 | Colgrove et al. |
| 2013/0346810 A1 | 12/2013 | Kimmel et al. |
| 2014/0006353 A1 | 1/2014 | Chen et al. |
| 2014/0013068 A1 | 1/2014 | Yamato et al. |
| 2014/0052764 A1 | 2/2014 | Michael et al. |
| 2014/0059309 A1 | 2/2014 | Brown et al. |
| 2014/0068184 A1 | 3/2014 | Edwards et al. |
| 2014/0081906 A1 | 3/2014 | Geddam et al. |
| 2014/0082255 A1 | 3/2014 | Powell |
| 2014/0082273 A1 | 3/2014 | Segev |
| 2014/0089264 A1 | 3/2014 | Talagala et al. |
| 2014/0089683 A1 | 3/2014 | Miller et al. |
| 2014/0095758 A1 | 4/2014 | Smith et al. |
| 2014/0095803 A1 | 4/2014 | Kim et al. |
| 2014/0101115 A1 | 4/2014 | Ko et al. |
| 2014/0101298 A1 | 4/2014 | Shukla et al. |
| 2014/0108350 A1 | 4/2014 | Marsden |
| 2014/0108797 A1 | 4/2014 | Johnson et al. |
| 2014/0143207 A1 | 5/2014 | Brewer et al. |
| 2014/0149355 A1 | 5/2014 | Gupta et al. |
| 2014/0149647 A1 | 5/2014 | Guo et al. |
| 2014/0172811 A1 | 6/2014 | Green |
| 2014/0181370 A1 | 6/2014 | Cohen et al. |
| 2014/0185615 A1 | 7/2014 | Ayoub et al. |
| 2014/0195199 A1 | 7/2014 | Uluyol |
| 2014/0195480 A1 | 7/2014 | Talagala et al. |
| 2014/0195492 A1 | 7/2014 | Wilding et al. |
| 2014/0195564 A1 | 7/2014 | Talagala et al. |
| 2014/0208003 A1 | 7/2014 | Cohen et al. |
| 2014/0215129 A1 | 7/2014 | Kuzmin et al. |
| 2014/0215147 A1 | 7/2014 | Pan |
| 2014/0215170 A1 | 7/2014 | Scarpino et al. |
| 2014/0215262 A1 | 7/2014 | Li et al. |
| 2014/0223029 A1 | 8/2014 | Bhaskar et al. |
| 2014/0244962 A1 | 8/2014 | Arges et al. |
| 2014/0250440 A1 | 9/2014 | Carter et al. |
| 2014/0258681 A1 | 9/2014 | Prasky et al. |
| 2014/0279917 A1 | 9/2014 | Minh et al. |
| 2014/0279931 A1 | 9/2014 | Gupta et al. |
| 2014/0281017 A1 | 9/2014 | Apte |
| 2014/0281055 A1 | 9/2014 | Davda et al. |
| 2014/0281131 A1 | 9/2014 | Joshi et al. |
| 2014/0289476 A1 | 9/2014 | Nayak |
| 2014/0297980 A1 | 10/2014 | Yamazaki |
| 2014/0304548 A1 | 10/2014 | Steffan et al. |
| 2014/0310231 A1 | 10/2014 | Sampathkumaran et al. |
| 2014/0310373 A1 | 10/2014 | Aviles et al. |
| 2014/0325117 A1 | 10/2014 | Canepa et al. |
| 2014/0325147 A1 | 10/2014 | Nayak |
| 2014/0344222 A1 | 11/2014 | Morris et al. |
| 2014/0379965 A1 | 12/2014 | Gole et al. |
| 2015/0019792 A1 | 1/2015 | Swanson et al. |
| 2015/0032928 A1 | 1/2015 | Andrews et al. |
| 2015/0052315 A1 | 2/2015 | Ghai et al. |
| 2015/0058577 A1 | 2/2015 | Earl |
| 2015/0066852 A1 | 3/2015 | Beard et al. |
| 2015/0085665 A1 | 3/2015 | Kompella et al. |
| 2015/0085695 A1 | 3/2015 | Ryckbosch et al. |
| 2015/0089138 A1 | 3/2015 | Tao et al. |
| 2015/0089285 A1 | 3/2015 | Lim et al. |
| 2015/0095555 A1 | 4/2015 | Asnaashari et al. |
| 2015/0106556 A1 | 4/2015 | Yu et al. |
| 2015/0112939 A1 | 4/2015 | Cantwell et al. |
| 2015/0120754 A1 | 4/2015 | Chase et al. |
| 2015/0121021 A1 | 4/2015 | Nakamura et al. |
| 2015/0127922 A1 | 5/2015 | Camp et al. |
| 2015/0134926 A1 | 5/2015 | Yang et al. |
| 2015/0193338 A1 | 7/2015 | Sundaram et al. |
| 2015/0199415 A1 | 7/2015 | Bourbonnais et al. |
| 2015/0205663 A1 | 7/2015 | Sundaram et al. |
| 2015/0220402 A1 | 8/2015 | Cantwell et al. |
| 2015/0234709 A1 | 8/2015 | Koarashi |
| 2015/0242478 A1 | 8/2015 | Cantwell et al. |
| 2015/0244795 A1 | 8/2015 | Cantwell et al. |
| 2015/0261446 A1 | 9/2015 | Lee |
| 2015/0261792 A1 | 9/2015 | Attarde et al. |
| 2015/0269201 A1 | 9/2015 | Caso et al. |
| 2015/0286438 A1 | 10/2015 | Simionescu et al. |
| 2015/0288671 A1 | 10/2015 | Chan et al. |
| 2015/0293817 A1 | 10/2015 | Subramanian et al. |
| 2015/0324236 A1 | 11/2015 | Gopalan et al. |
| 2015/0324264 A1 | 11/2015 | Chinnakkonda Vidyapoornachary et al. |
| 2015/0339194 A1 | 11/2015 | Kalos et al. |
| 2015/0363328 A1* | 12/2015 | Candelaria .......... G06F 12/0864 711/216 |
| 2015/0370715 A1 | 12/2015 | Samanta et al. |
| 2015/0378613 A1 | 12/2015 | Koseki |
| 2016/0004733 A1 | 1/2016 | Cao et al. |
| 2016/0026552 A1 | 1/2016 | Holden et al. |
| 2016/0034358 A1 | 2/2016 | Hayasaka et al. |
| 2016/0070480 A1 | 3/2016 | Babu et al. |
| 2016/0070490 A1 | 3/2016 | Koarashi et al. |
| 2016/0070618 A1 | 3/2016 | Pundir et al. |
| 2016/0070644 A1 | 3/2016 | D'Sa et al. |
| 2016/0070714 A1 | 3/2016 | D'Sa et al. |
| 2016/0077744 A1 | 3/2016 | Pundir et al. |
| 2016/0139838 A1 | 5/2016 | D'Sa et al. |

(56) References Cited

U.S. PATENT DOCUMENTS

| | | |
|---|---|---|
| 2016/0149763 A1 | 5/2016 | Ingram et al. |
| 2016/0179410 A1 | 6/2016 | Haas et al. |
| 2016/0203043 A1 | 7/2016 | Nazari et al. |
| 2016/0248583 A1 | 8/2016 | McClanahan et al. |
| 2016/0350192 A1 | 12/2016 | Doherty et al. |
| 2016/0371021 A1 | 12/2016 | Goldberg et al. |
| 2017/0017413 A1 | 1/2017 | Aston et al. |
| 2017/0031769 A1 | 2/2017 | Zheng et al. |
| 2017/0031774 A1 | 2/2017 | Bolen et al. |
| 2017/0032013 A1 | 2/2017 | Zheng et al. |
| 2017/0046257 A1 | 2/2017 | Babu et al. |
| 2017/0083535 A1 | 3/2017 | Marchukov et al. |
| 2017/0091056 A1 | 3/2017 | Watanabe et al. |
| 2017/0123726 A1 | 5/2017 | Sinclair et al. |

FOREIGN PATENT DOCUMENTS

| | | |
|---|---|---|
| EP | 2693358 A1 | 2/2014 |
| EP | 2735978 A1 | 5/2014 |
| WO | WO-2006050455 A2 | 5/2006 |
| WO | WO-2010033962 A1 | 3/2010 |
| WO | WO-2012132943 A1 | 10/2012 |

OTHER PUBLICATIONS

Cornwall, Michael, "Anatomy of a Solid-state Drive," ACM Queue—Networks, vol. 10, No. 10, Oct. 2012, pp. 1-7.

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Hwang, Kai et al., "RAID-x: A New Distributed Disk Array for I/O-centric Cluster Computing", IEEE High-Performance Distributed Computing, Aug. 2000, pp. 279-286.

Leventhal, Adam H. "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Ongaro, Diego et al., "In Search of an Understandable Consensus Algorithm," Stanford University, May 2013. Downloaded from https://ramcloud.stanford.edu/wiki/download/attachments/11370504/raft.pdf, (14 pages).

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the $13^{th}$ ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Po-Liang, et al., "A File-System-Aware FTL Design for Flash-Memory Storage Systems," Design, Automation & Test in Europe Conference & Exhibition, IEEE, 2009, pp. 1-6.

Agrawal, et al., "Design Tradeoffs for SSD Performance," USENIX Annual Technical Conference, 2008, 14 Pages.

Alvaraez C., "NetApp Deduplication for Fas and V-Series Deployment and Implementation Guide," Technical Report TR-3505, 2011, 71 pages.

Amit et al., "Strategies for Mitigating the IOTLB Bottleneck," Technion—Israel Institute of Technology, IBM Research Haifa, WIOSCA 2010—Sixth Annual Workshop on the Interaction between Operating Systems and Computer Architecture, 2010, 12 pages.

Arpaci-Dusseau R., et al., "Log-Structured File Systems," Operating Systems: Three Easy Pieces published by Arpaci-Dusseau Books, May 25, 2014, 15 pages.

Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.

Ben-Yehuda et al., "The Price of Safety: Evaluating IOMMU Performance," Proceedings of the Linux Symposium, vol. 1, Jun. 27-30, 2007, pp. 9-20.

Bitton D. et al., "Duplicate Record Elimination in Large Data Files," Oct. 26, 1999, 11 pages.

Bogaerdt, "cdeftutorial," http://oss.oetiker.ch/rrdtool/tut/cdeftutorial.en.html Date obtained from the internet, Sep. 9, 2014, 14 pages.

Bogaerdt, "Rates, Normalizing and Consolidating," http://www.vandenbogaerdt.nl/rrdtool/process.php Date obtained from the internet: Sep. 9, 2014, 5 pages.

Bogaerdt, "rrdtutorial," http://oss.oetiker.ch/rrdtool/lul/rrdtutorial.en.html Date obtained from the internet, Sep. 9, 2014, 21 pages.

Chris K., et al., "How many primes are there?" Nov. 2001. https://web.archive.org/web/20011120073053/http://primes.utm.edu/howmany.shtml.

Debnath, et al., "ChunkStash: Speeding up in line Storage Deduplication using Flash Memory," USENIX, USENIXATC '10, Jun. 2010, 15 pages.

Fan, et al., "MemC3: Compact and Concurrent MemCache with Dumber Caching and Smarter Hashing," USENIX NSDI '13, Apr. 2013, pp. 371-384.

Final Office Action dated Dec. 2, 2015, for U.S. Appl. No. 14/684,956, filed Apr. 13, 2015, 12 pages.

Final Office Action dated Dec. 22, 2015, for U.S. Appl. No. 13/857,008, filed Apr. 4, 2013, 10 pages.

Final Office Action dated Dec. 4, 2013, for U.S. Appl. No. 13/856,997, filed Apr. 4, 2013, 25 pages.

Final Office Action dated Dec. 4, 2015, for U.S. Appl. No. 14/454,197, filed Aug. 7, 2014, 11 pages.

Final Office Action dated Feb. 16, 2016, for U.S. Appl. No. 14/186,847, filed Feb. 21, 2014, 25 pages.

Final Office Action dated Feb. 2, 2016, for U.S. Appl. No. 13/856,958, filed Apr. 4, 2013, 18 pages.

Final Office Action dated Feb. 6, 2014, for U.S. Appl. No. 13/856,958, filed Apr. 4, 2013, 16 pages.

Final Office Action dated Mar. 2, 2016 for U.S. Appl. No. 14/701,832, filed May 1, 2015, 16 pages.

Final Office Action dated May 13, 2013, for U.S. Appl. No. 13/041,122, filed Mar. 4, 2011, 22 pages.

Final Office Action dated Nov. 25, 2015, for U.S. Appl. No. 14/684,966, filed Apr. 13, 2015, 21 pages.

(56) References Cited

OTHER PUBLICATIONS

Gulati et al., "BASIL: Automated IO Load Balancing Across Storage Devices," Proceedings of the 8th USENIX Conference on File and Storage Technologies, FAST'10, Berkeley, CA, USA, 2010, 14 pages.
Intel, Product Specification—Intel® Solid-State Drive DC S3700, Jun. 2013, 32 pages.
International Search Report and Written Opinion for Application No. PCT/EP2014/071446 dated Apr. 1, 2015, 14 pages.
International Search Report and Written Opinion for Application No. PCT/US2012/071844 dated Mar. 1, 2013, 12 pages.
International Search Report and Written Opinion for Application No. PCT/US2014/035284 dated Apr. 1, 2015, 8 pages.
International Search Report and Written Opinion for Application No. PCT/US2014/055138 dated Dec. 12, 2014, 13 pages.
International Search Report and Written Opinion for Application No. PCT/US2014/058728 dated Dec. 16, 2014, 11 pages.
International Search Report and Written Opinion for Application No. PCT/US2014/060031 dated Jan. 26, 2015, 9 pages.
International Search Report and Written Opinion for Application No. PCT/US2014/071446 dated Apr. 1, 2015, 13 pages.
International Search Report and Written Opinion for Application No. PCT/US2014/071465 dated Mar. 25, 2015, 12 pages.
International Search Report and Written Opinion for Application No. PCT/US2014/071484 dated Mar. 25, 2015, 9 pages.
International Search Report and Written Opinion for Application No. PCT/US2014/071581 dated Apr. 10, 2015, 9 pages.
International Search Report and Written Opinion for Application No. PCT/US2014/071635 dated Mar. 31, 2015, 13 pages.
International Search Report and Written Opinion for Application No. PCT/US2015/016625 dated Sep. 17, 2015, 8 pages.
International Search Report and Written Opinion for Application No. PCT/US2015/021285 dated Jun. 23, 2015, 8 pages.
International Search Report and Written Opinion for Application No. PCT/US2015/024067 dated Jul. 8, 2015, 7 pages.
International Search Report and Written Opinion for Application No. PCT/US2015/048800 dated Nov. 25, 2015, 11 pages.
International Search Report and Written Opinion for Application No. PCT/US2015/056932 dated Jan. 21, 2016, 11 pages.
International Search Report and Written Opinion for Application No. PCT/US2015/057532 dated Feb. 9, 2016, 12 pages.
Kagel A.S, "two-way merge sort," Dictionary of Algorithms and Data Structures [online], retrieved on Jan. 28, 2015, Retrieved from the Internet :<URL: http://xlinux.nist.gov/dads/HTMUIwowaymrgsrl.html>, May 2005, 1 page.
Lamport L., "The Part-Time Parliament," ACM Transactions on Computer Systems, May 1998, vol. 16 (2), pp. 133-169.
Metreveli et al. "CPHash: A Cache-Partitioned Hash Table." Nov. 2011. https://people.csail.mit.edu/nickolai/papers/metrevelicphash-tr.pdf.
Non-Final Office Action dated Aug. 12, 2015, for U.S. Appl. No. 14/684,929, filed Apr. 13, 2015, 20 pages.
Non-Final Office Action dated Aug. 13, 2015, for U.S. Appl. No. 13/856,958, filed Apr. 4, 2013, 15 pages.
Non-Final Office Action dated Aug. 13, 2015, for U.S. Appl. No. 14/186,847, filed Feb. 21, 2014, 20 pages.
Non-Final Office Action dated Aug. 21, 2013, for U.S. Appl. No. 13/856,997, filed Apr. 4, 2013, 19 pages.
Non-Final Office Action dated Aug. 7, 2015, for U.S. Appl. No. 14/684,894, filed Apr. 13, 2015, 10 pages.
Non-Final Office Action dated Dec. 5, 2012, for U.S. Appl. No. 13/041,122, filed Mar. 4, 2011, 21 pages.
Non-Final Office Action dated Jan. 29, 2016, for U.S. Appl. No. 14/454,197, filed Aug. 7, 2014, 11 pages.
Non-Final Office Action dated Jul. 1, 2015, for U.S. Appl. No. 13/857,008, filed Apr. 4, 2013, 10 pages.
Non-Final Office Action dated Jul. 14, 2015, for U.S. Appl. No. 14/454,197, filed Aug. 7, 2014, 5 pages.
Non-Final Office Action dated Jul. 14, 2015, for U.S. Appl. No. 14/684,956, filed Apr. 13, 2015, 5 pages.
Non-Final Office Action dated Jul. 14, 2015, for U.S. Appl. No. 14/684,966, filed Apr. 13, 2015, 21 pages.
Non-Final Office Action dated Jul. 29, 2015, for U.S. Appl. No. 14/292,089, filed May 30, 2014, 4 pages.
Non-Final Office Action dated Jul. 31, 2013, for U.S. Appl. No. 13/856,958, filed Apr. 4, 2013, 15 pages.
Non-Final Office Action dated Jul. 31, 2015 for U.S. Appl. No. 14/259,467, filed Apr. 23, 2014, 10 pages.
Non-Final Office Action dated Jul. 31, 2015, for U.S. Appl. No. 14/684,942, filed Apr. 13, 2015, 4 pages.
Non-Final Office Action dated Jun. 17, 2013, for U.S. Appl. No. 13/041,095, filed Mar. 4, 2011, 10 pages.
Non-Final Office Action dated Jun. 30, 2015, for U.S. Appl. No. 14/057,145, filed Oct. 18, 2015, 21 pages.
Non-Final Office Action dated Mar. 31, 2016, for U.S. Appl. No. 14/941,938.
Non-Final Office Action dated Oct. 19, 2015, for U.S. Appl. No. 14/701,832, filed May 1, 2015, 11 pages.
Non-Final Office Action dated Jan. 26, 2016 for U.S. Appl. No. 14/932,063, filed Nov. 4, 2015, 9 pages.
Non-Final Office Action dated Sep. 10, 2014, for U.S. Appl. No. 13/338,039, filed Dec. 27, 2011, 10 pages.
Notice Allowance dated Jan. 21, 2016, for U.S. Appl. No. 14/684,894, filed Apr. 13, 2015, 13 pages.
Notice of Allowance dated Apr. 14, 2015, for U.S. Appl. No. 13/856,997, filed Apr. 4, 2013, 18 pages.
Notice of Allowance dated Apr. 24, 2014, for U.S. Appl. No. 13/041,122, filed Mar. 4, 2011, 14 pages.
Notice of Allowance dated Aug. 24, 2016, for U.S. Appl. No. 14/684,956, filed Apr. 13, 2015, 4 pages.
Notice of Allowance dated Aug. 27, 2015 for U.S. Appl. No. 14/684,914, filed Apr. 13, 2015, 10 pages.
Notice of Allowance dated Dec. 8, 2014, for U.S. Appl. No. 13/338,039, filed Dec. 27, 2011, 7 pages.
Notice of Allowance dated Feb. 22, 2016, for U.S. Appl. No. 14/057,145, filed Oct. 18, 2015, 12 pages.
Notice of Allowance dated Mar. 29, 2016, for U.S. Appl. No. 14/454,197, filed Aug. 7, 2014, 7 pages.
Notice of Allowance dated May 4, 2016 for U.S. Appl. No. 14/932,063, filed Nov. 4, 2015, 7 pages.
Notice of Allowance dated Oct. 9, 2013, for U.S. Appl. No. 13/041,095, filed Mar. 4, 2011, 7 pages.
Oetiker, "rrdfetch," http ://oss.oetiker.ch/rrdtool/doc/rrdfetch .en. html, Date obtained from the internet: Sep. 9, 2014, 5 pages.
Oetiker, "rrdtool," http :/loss. oetiker.ch/rrdtool/doc/rrdtool.en. html Date obtained from the internet: Sep. 9, 2014, 5 pages.
O'Neil P., et al., "The Log-structured Merge-tree (lsm-tree)," Acta Informatica, 33, 1996, pp. 351-385.
Ongaro, et al., "In search of an understandable consensus algorithm (extended version)," 2014, 18 pages.
Proceedings of the FAST 2002 Conference on File Storage Technologies, Monterey, California, USA, Jan. 28-30, 2002, 14 pages.
Rosenblum M., et al., "The Design and Implementation of a Log-Structured File System," In Proceedings of ACM Transactions on Computer Systems, vol. 10(1),Feb. 1992, pp. 26-52.
Rosenblum M., et al., "The Design and Implementation of a Log-Structured File System," (SUN00006867-SUN00006881), Jul. 1991, 15 pages.
Rosenblum M., et al., "The LFS Storage Manager," USENIX Technical Conference, Anaheim, CA, (Sun 00007397-SUN00007412), Jun. 1990, 16 pages.
Sears., et al., "Blsm: A General Purpose Log Structured Merge Tree," Proceedings of the 2012 ACM SIGMOD International Conference on Management, 2012, 12 pages.
Stoica et al. "Chord: A Scalable Peer-to-peer Lookup Service for Internet Applications." Aug. 2001. ACM. SIGCOMM '01.
Supplementary European Search Report for Application No. EP12863372 dated Jul. 16, 2015, 7 pages.
Texas Instruments, User Guide, TMS320C674x/OMAP-L1 x Processor Serial ATA (SATA) Controller, Mar. 2011, 76 Pages.
Wilkes J., et al., "The Hp Auto Raid Hierarchical Storage System," Operating System Review, ACM, New York, NY, Dec. 1, 1995, vol. 29 (5), pp. 96-108.

(56) References Cited

OTHER PUBLICATIONS

International Search Report and Written Opinion for Application No. PCT/US2015/048810 dated Dec. 23, 2015, 11 pages.
Dictionary definition for references, retrieved from: http://www.dictionary.com/browse/reference?s=t on Dec. 23, 2017.
Enclopedia entry for pointers vs. references, retrieved from: https://www.geeksforgeeks.org/pointers-vs-references-cpp/ on Dec. 23, 2017.
Jude Nelson "Syndicate: Building a Virtual Cloud Storage Service Through Service Composition" Princeton University, 2013, pp. 1-14.

* cited by examiner

OPTIMIZED SEGMENT CLEANING TECHNIQUE

BACKGROUND

Technical Field

The present disclosure relates to storage systems and, more specifically, to optimized segment cleaning in one or more storage systems of a cluster.

Background Information

A storage system typically includes one or more storage devices, such as solid state drives (SSDs) embodied as flash storage devices of a storage array, into which information may be entered, and from which the information may be obtained, as desired. The storage system may implement a high-level module, such as a file system, to logically organize the information stored on the storage devices of the array as storage containers, such as files or logical units (LUNs). Each storage container may be implemented as a set of data structures, such as data blocks that store data for the storage containers and metadata blocks that describe the data of the storage containers. For example, the metadata may describe, e.g., identify, storage locations on the devices for the data. In addition, the metadata may contain copies of a reference to a storage location for the data (i.e., many-to-one), thereby requiring updates to each copy of the reference when the location of the data changes. This contributes significantly to write amplification as well as to system complexity (i.e., tracking the references to be updated).

Some types of SSDs, especially those with NAND flash components, may or may not include an internal controller (i.e., inaccessible to a user of the SSD) that moves valid data from old locations to new locations among those components at the granularity of a page (e.g., 8 Kbytes) and then only to previously-erased pages. Thereafter, the old locations where the pages were stored are freed, i.e., the pages are marked for deletion (or as invalid). Typically, the pages are erased exclusively in blocks of 32 or more pages (i.e., 256 KB or more). Moving of valid data from old to new locations. i.e., garbage collection, contributes to write amplification in the system. It is therefore desirable to move the valid data as least frequently as possible so as not to amplify the number of times data is written, i.e., to reduce write amplification.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
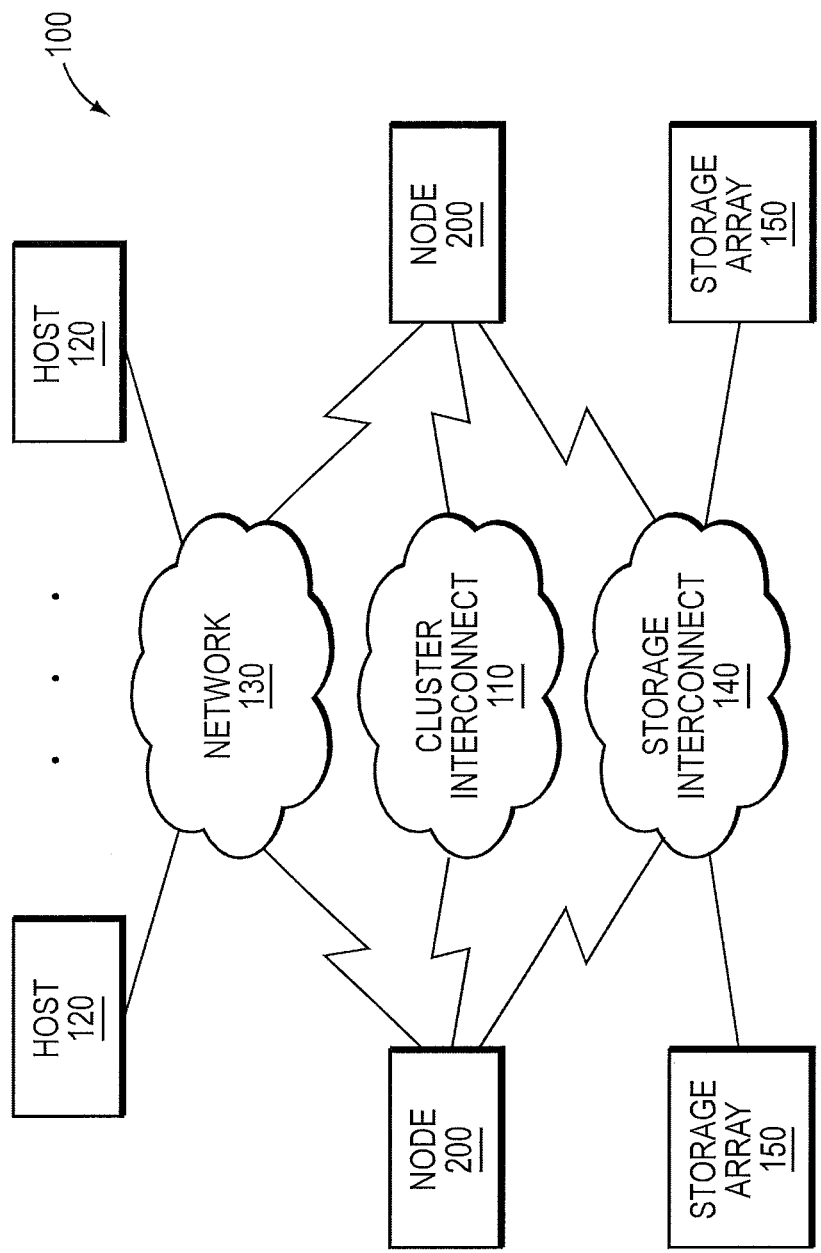
FIG. 1 is a block diagram of a plurality of nodes interconnected as a cluster.

The embodiments described herein are directed to an optimized segment cleaning technique configured to efficiently clean one or more selected portions or segments of a storage array coupled to one or more nodes of a cluster. An extent store layer of a file system of a storage input/output (I/O) stack executing on the one or more nodes provides sequential storage of data and metadata on solid state drives (SSDs) of the storage array. The data (and metadata) may be organized as an arbitrary number of variable-length extents of one or more host-visible logical units (LUNs) served by the nodes. The metadata may include mappings from host-visible logical block address ranges (i.e., offset ranges) of a LUN to extent keys, as well as mappings of the extent keys to locations of the extents stored on the SSDs. The mappings of extent keys to the locations of the extents are illustratively extent metadata organized as entries of hash tables and other metadata data structures stored in a memory (in-core) of the one or more nodes. The location of an extent illustratively includes a segment identifier (ID) of a segment containing a most recent version of the extent and an offset of a block of the segment (i.e., segment offset) containing the extent.

In an embodiment, the extent store layer maintains accounting structures, e.g., free segment maps indicating an amount of segment free space, as well as other data structures having information on heuristics and policies, which are illustratively employed by a segment cleaning process to determine the segment ID of the old segment. The segment cleaning process may use the segment ID to scan the entries of the in-core hash tables and metadata data structures to find matches to the segment ID. As noted, the extent metadata (e.g., locations) of the entries include references to the most recent versions of the extents; accordingly, any valid extents of the old segment that need to be relocated may be identified and relocated to the new segment.

In an embodiment, a bottom-up approach of the segment cleaning technique is configured to read all blocks of a segment to be cleaned (i.e., an "old" segment) to locate the extents stored on the SSDs of the segment and examine the extent metadata to determine whether the extents are valid. Each extent stored on SSD is self-describing; that is, the extent includes a header containing information describing the extent, e.g., an extent key. The segment cleaning process of the extent store layer uses the extent key of each extent to find the extent metadata entries of the in-core hash tables and metadata data structures to determine a segment ID of a segment containing the most recent version of the extent. If the segment ID (and other location information) of an entry matches the segment ID (and other location information) of the old segment, the extent referenced by the extent key is determined to be valid (i.e., the most recent version) and is copied (relocated) to a segment being written (i.e., a "new" segment) by the segment cleaning process. If the segment ID of the entry does not match the segment ID of the old segment, then the extent referenced by the extent key is not the most recent version (i.e., is determined to be invalid) and can be overwritten.

In an embodiment, a top-down approach of the segment cleaning technique obviates reading of the blocks of the old segment to locate the extents and, instead, examines the in-core extent metadata to determine the valid extents of the old segment. This approach of the segment cleaning technique takes into consideration that the old segment may have been relatively full with valid extents at one time, but before cleaning, some of those extents may have been logically overwritten, i.e., to a same LBA range, leaving the overwritten extent as stale data on the segment. Therefore, the logically overwritten extents, i.e., invalid extents, do not have to be copied (relocated).

In an embodiment, a hybrid approach of the segment cleaning technique is configured to further reduce reading of blocks of the old segment, especially for compressed extents sharing a common block. The hybrid approach may perform an occasional full stripe read operation, particularly in the event of reconstructing missing blocks (data and/or metadata) from a missing or inaccessible SSD. To that end, the hybrid approach uses the top-down approach to determine the segment ID of the old segment, scan the entries of the in-core hash tables and metadata data structures to find matches to the segment ID, and identify the valid extents of the old segment that need to be relocated to the new segment. A relocation list may be created, e.g., by the segment cleaning process, which identifies the blocks of the valid extents of the old segment that need to be read (and relocated) and any blocks that need to be read on accessible SSDs to satisfy the reconstruction of the missing blocks of the inaccessible SSD. The segment cleaning process may then sort the blocks (extents) by SSD location according to read operations required for the blocks of the extents to be relocated, and then i) combine one or more adjacent locations into a single larger read operation; and ii) coalesce any redundant location references to blocks, e.g., two read operations needed to relocate two valid extents that share a common block may be coalesced to one read operation of the common block. Upon sorting and coalescing the list, a reduced number of read operations may be determined to relocate blocks and optimize segment cleaning.

Advantageously, the bottom-up approach may be employed when the SSDs of the old segment (i.e., to be cleaned) are relatively full (i.e., exceeding a capacity threshold) with valid extents (blocks) to leverage full stripe read operations with a reduced number of SSD accesses for a read path of the storage I/O stack. In contrast, the top-down approach may be employed when i) an SSD is inaccessible (i.e., missing or fails); and ii) the SSDs of the segment are relatively empty (i.e., below a capacity threshold with respect to valid extents) because it is only necessary to read a portion of the blocks in the old segment to access those valid extents, as opposed reading all of the blocks of the segment. The hybrid approach may be employed to extend the top-down approach to include only full stripe read operations needed for relocation and reconstruction of blocks, while also avoiding any unnecessary read operations of the bottom-down approach. Notably, after performing a full stripe read operation, the hybrid approach may directly retrieve any valid extents from the stripe using, e.g., the segment offsets obtained from scanning the hash tables.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC, when accessing information in the form of storage containers such as logical units (LUNs). Notably, any of the nodes 200 may service a request directed to a storage container stored on the cluster 100.

Figure 2:
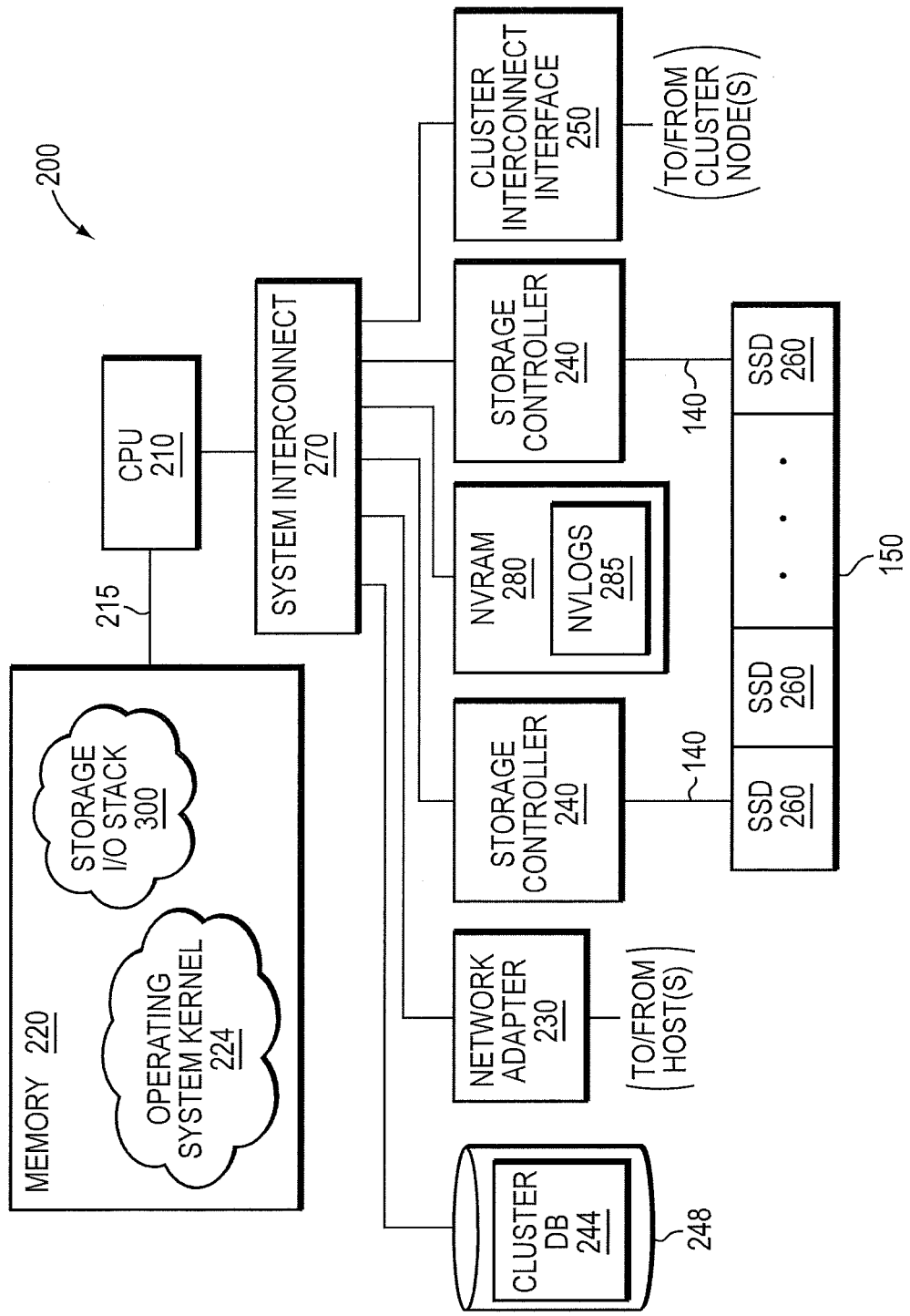
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250, and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements may be used, such as a conventional serial ATA (SATA) topology or a PCI topology. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
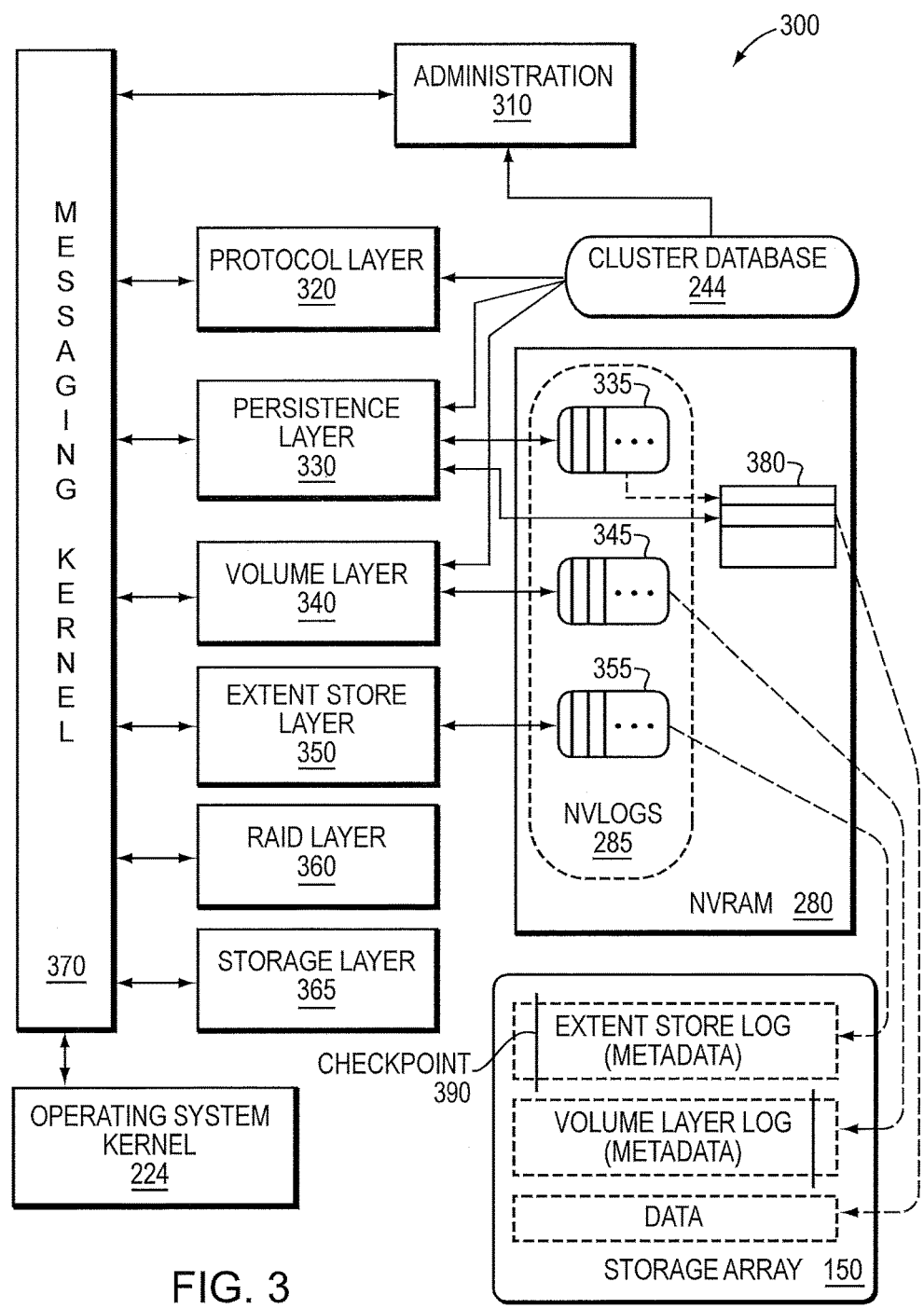
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a is single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoints with incremental changes recorded in one or more log files) in which selected in-core mappings (less than the total) are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
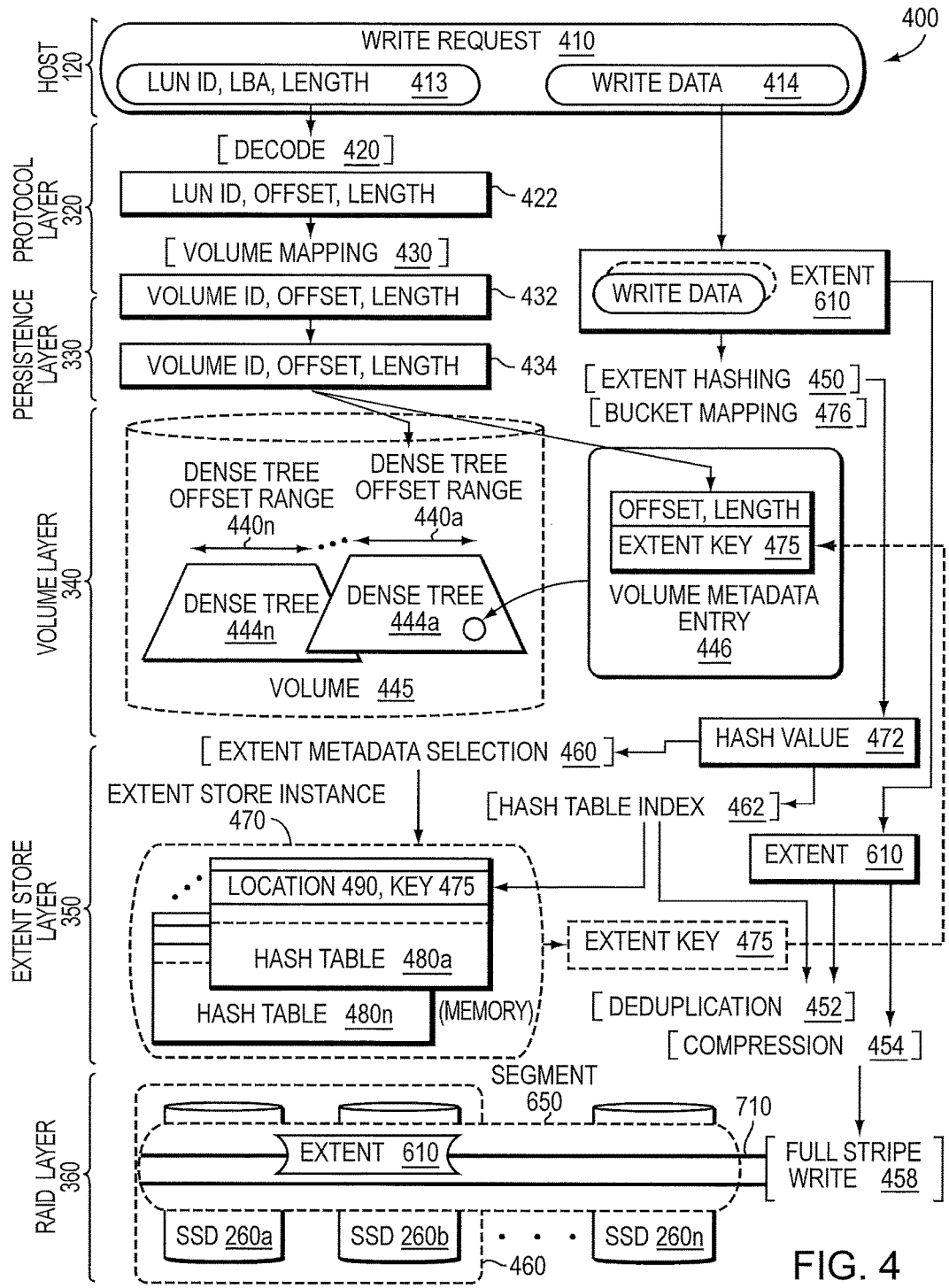
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 610 and perform a hash computation, i.e., a hash function, on the new extent to generate a hash value 472 in accordance with an extent hashing technique 450.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (i.e., extent store instance 470) that is responsible for storing the new extent 610. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 610 to the appropriate volume layer instance and onto the appropriate extent store instance via an extent store put operation. The extent hashing technique 450 may embody an approximately uniform hash function to ensure that any random extent to be written may have an approximately equal chance of falling into any extent store instance 470, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 460 that (i) selects an appropriate hash table 480 (e.g., hash table 480a) from a set of hash tables (illustratively in-core) within the extent store instance 470, and (ii) extracts a hash table index 462 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 460 described herein. If a table entry with a matching extent key is found, then the SSD location 490 mapped from the extent key 475 is used to retrieve an existing extent (not shown) from SSD. The existing extent is then compared with the new extent 610 to determine whether their data is identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 475 of the existing extent is passed to the appropriate volume layer instance for storage within an entry (denoted as volume metadata entry 446) of a dense tree metadata structure 444 (e.g., dense tree 444a), such that the extent key 475 is associated an offset range 440 (e.g., offset range 440a) of the volume 445.

However, if the data of the existing extent is not identical to the data of the new extent 610, a collision occurs and a deterministic algorithm is invoked to sequentially generate as many new candidate extent keys (not shown) mapping to the same bucket as needed to either provide de-duplication 452 or to produce an extent key that is not already stored within the extent store instance. Notably, another hash table (e.g. hash table 480n) may be selected by a new candidate extent key in accordance with the extent metadata selection technique 460. In the event that no de-duplication opportunity exists (i.e., the extent is not already stored) the new extent 610 is compressed in accordance with compression technique 454 and passed to the RAID layer 360, which processes the new extent 610 for storage on SSD 260 within one or more stripes 710 of RAID group 466. The extent store instance may cooperate with the RAID layer 360 to identify a storage segment 650 (i.e., a portion of the storage array 150) and a location on SSD 260 within the segment 650 in which to store the new extent 610. Illustratively, the identified storage segment is a segment with a large contiguous free space having, e.g., location 490 on SSD 260b for storing the extent 610.

In an embodiment, the RAID layer 360 then writes the stripes 710 across the RAID group 466, illustratively as one or more full stripe writes 458. The RAID layer 360 may write a series of stripes 710 of sufficient depth to reduce data relocation that may occur within the flash-based SSDs 260 (i.e., flash block management). The extent store instance then (i) loads the SSD location 490 of the new extent 610 into the selected hash table 480n (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer log 345. Accordingly, the I/O (write) request is sufficiently stored on SSD 260 of the cluster.

Read Path

Figure 5:
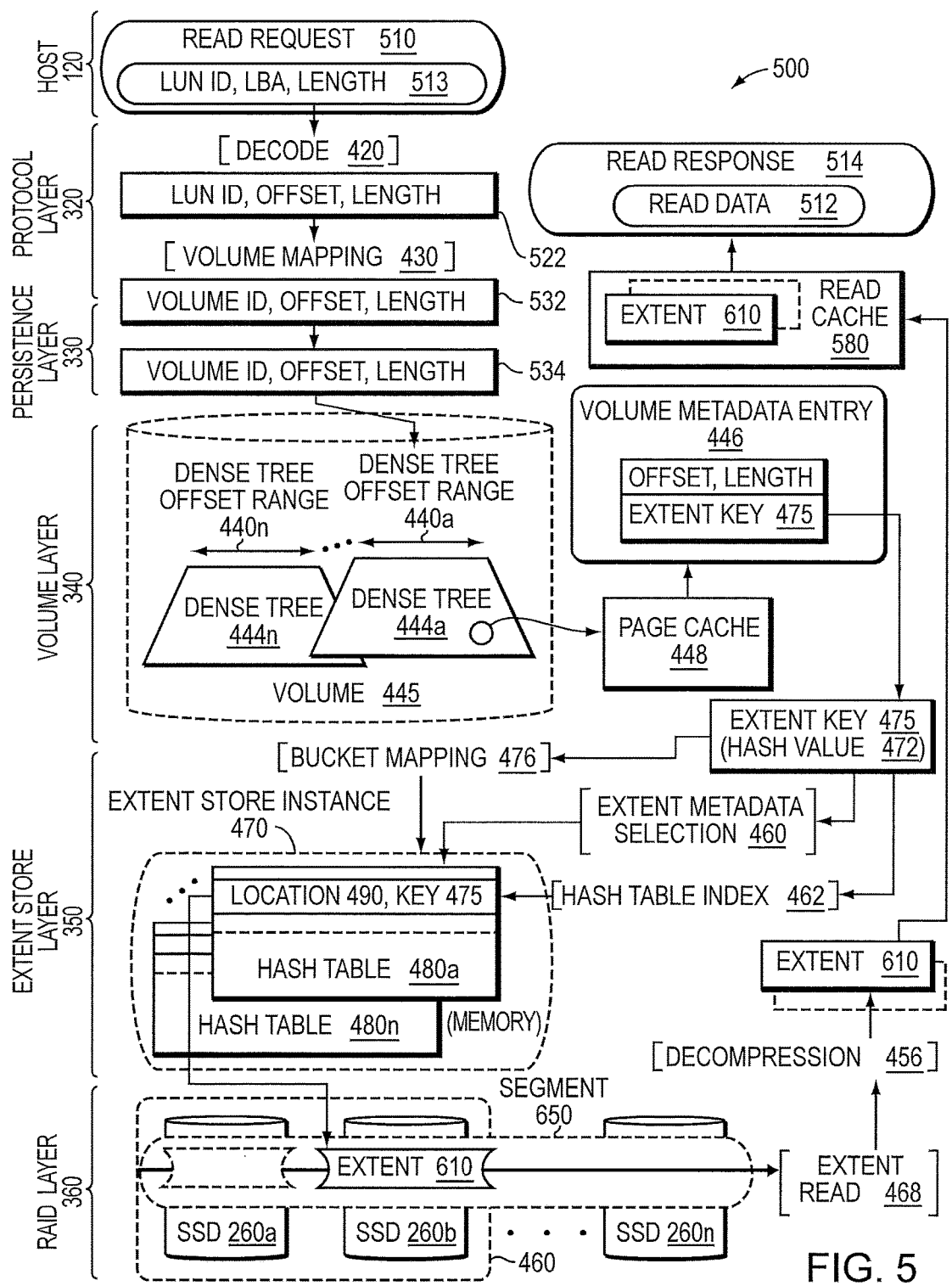
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism, (e.g., RPC, for inter-node communication) or the IPC mechanism, (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 475 associated with one or more extents 610 (or portions of extents) within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched to find any overlapping entries. This process is then iterated until one or more volume metadata entries 446 of a level are found to ensure that the extent key(s) 475 for the entire requested read range are found. If no metadata entries exist for the entire or portions of the requested range, then the missing portion(s) are zero filled.

Once found, each extent key 475 is processed by the volume layer 340 to, e.g., implement the bucket mapping technique 476 that translates the extent key to an appropriate extent store instance 470 responsible for storing the requested extent 610. Note that, in an embodiment, each extent key 475 may be substantially identical to the hash value 472 associated with the extent 610, i.e., the hash value as calculated during the write request for the extent, such that the bucket mapping 476 and extent metadata selection 460 techniques may be used for both write and read path operations. Note also that the extent key 475 may be derived from the hash value 472. The volume layer 340 may then pass the extent key 475 (i.e., the hash value from a previous write request for the extent) to the appropriate extent store instance 470 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 460 that (i) selects an appropriate hash table 480 (e.g., hash table 480a) from a set of hash tables within the extent store instance 470, and (ii) extracts a hash table index 462 from the extent key 475 (i.e., hash value 472) to index into the selected hash table and lookup a table entry having a matching extent key 475 that identifies a storage location 490 on SSD 260 for the extent 610. That is, the SSD location 490 mapped to the extent key 475 may be used to retrieve the existing extent (denoted as extent 610) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although it will be understood to those skilled in the art that decompression can be performed at any layer of the storage I/O stack 300. The extent 610 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Layered File System

The embodiments described herein illustratively employ a layered file system of the storage I/O stack. The layered file system includes a flash-optimized, log-structured layer (i.e., extent store layer) of the file system configured to provide sequential storage of data and metadata (i.e., log-structured layout) on the SSDs 260 of the cluster. The data may be organized as an arbitrary number of variable-length extents of one or more host-visible LUNs served by the nodes. The metadata may include mappings from host-visible logical block address ranges (i.e., offset ranges) of a LUN to extent keys, as well as mappings of the extent keys to SSD storage locations of the extents. Illustratively, the volume layer of the layered file system cooperates with the extent store layer to provide a level of indirection that facilitates efficient log-structured layout of extents on the SSDs by the extent store layer.

In an embodiment, functions of the log-structured layer of the file system, such as write allocation and flash device (i.e., SSD) management, are performed and maintained by the extent store layer 350. Write allocation may include gathering of the variable-length extents to form full stripes that may be written to free segments across SSDs of one or more RAID groups. That is, the log-structured layer of the file system writes extents to initially free (i.e., clean) segments as full stripes rather than partial stripes. Flash device management may include segment cleaning to create such free segments that indirectly map to the SSDs via the RAID groups. Accordingly, partial RAID stripe writes are avoided, which results in reduced RAID-related write amplification.

Instead of relying on garbage collection in the SSDs, the storage I/O stack may implement segment cleaning (i.e., garbage collection) in the extent store layer to bypass performance impacts of flash translation layer (FTL) functionality (including garbage collection) in the SSD. In other words, the storage I/O stack allows the log-structured layer of the file system to operate as a data layout engine using segment cleaning to effectively replace a substantial portion of the FTL functionality of the SSD. The extent store layer may thus process random write requests in accordance with segment cleaning (i.e., garbage collection) to predict flash behavior within its FTL functionality. As a result, a log-structured equivalent source of write amplification for the storage I/O stack may be consolidated and managed at the extent store layer. In addition, the log-structured layer of the file system may be employed, in part, to improve write performance from the flash devices of the storage array.

As noted, the log-structured layout of SSDs is realized by sequentially writing extents to clean segments. Thus, the log-structured layout (i.e., sequential storage) employed by the extent store layer inherently supports variable length extents, thereby allowing unrestricted compression of extents prior to storage on SSD and without specific block level (i.e., in SSD blocks) metadata support from the SSDs, such as 520 byte sectors supporting 512 bytes of data and 8 bytes of metadata (e.g., a pointer to another block containing a tail-end of compressed data.) Typically, consumer grade SSDs support sectors as powers of 2 (e.g., 512 bytes), whereas more expensive enterprise grade SSDs may support enhanced sized sectors (e.g., 520 bytes). Accordingly, the extent store layer may operate with lower cost consumer grade SSDs while supporting variable length extents with their concomitant unfettered compression.

Segment Cleaning

Figure 6:
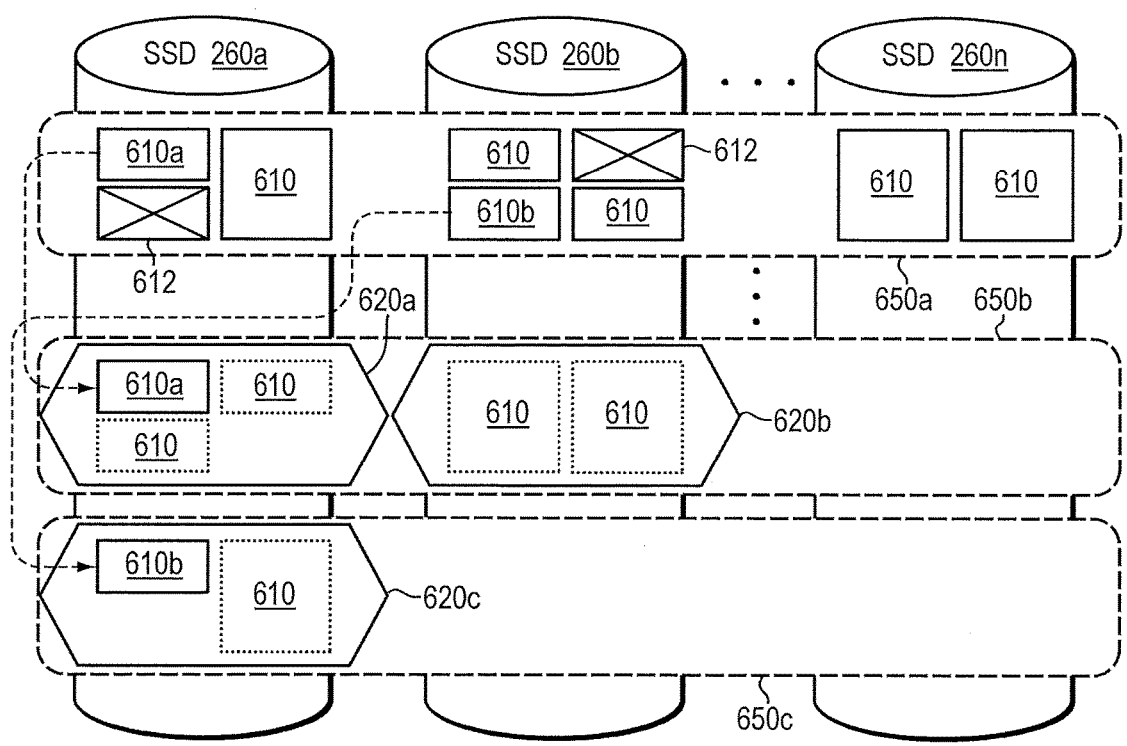
FIG. 6 illustrates segment cleaning by a layered file system of the storage I/O stack.

FIG. 6 illustrates segment cleaning by the layered file system. In an embodiment, the extent store layer 350 of the layered file system may write extents to an empty or free region or "segment." Before rewriting that segment again, the extent store layer 350 may clean the segment in accordance with segment cleaning which, illustratively, may be embodied as a segment cleaning process. The segment cleaning process may read all valid extents 610 from an old segment 650a and write those valid extents (i.e., extents not deleted or overwritten 612) to one or more new segments 650b-c, to thereby free-up (i.e., "clean") the old segment 650a. New extents may then be written sequentially to the old (now clean) segment. The layered file system may maintain a certain amount of reserve space (i.e., free segments) to enable efficient performance of segment cleaning. For example, the layered file system may illustratively maintain a reserve space of free segments equivalent to approximately 7% of storage capacity. The sequential writing of new extents may manifest as full stripe writes 458, such that a single write operation to storage spans all SSDs in a RAID group 466. Write data may be accumulated until a stripe write operation of a minimum depth can be made.

Illustratively, segment cleaning may be performed to free one or more selected segments that indirectly map to SSDs. As used herein, a SSD may be composed of a plurality of segment chunks 620, wherein each chunk is illustratively approximately 2 GB in size. A segment may include a segment chunk 620a-c from each of a plurality of SSDs in a RAID group 466. Thus, for a RAID group having 24 SSDs, wherein the equivalent storage space of 22 SSDs store data (data SSDs) and the equivalent storage space of 2 SSDs store parity (parity SSDs), each segment may include 44 GB of data and 4 GB of parity. The RAID layer may further configure the RAID groups according to one or more RAID implementations, e.g., RAID 1, 4, 5 and/or 6, to thereby provide protection over the SSDs in the event of, e.g., failure to one or more SSDs. Notably, each segment may be associated with a different RAID group and, thus, may have a different RAID configuration, i.e., each RAID group may be configured according to a different RAID implementation. To free-up or clean selected segments, extents of the segments that contain valid data are moved to different clean segments and the selected segments (now clean) are freed for subsequent reuse. Segment cleaning consolidates fragmented free space to improve write efficiency, e.g., to stripes by reducing RAID-related amplification and to underlying flash blocks by reducing performance impacts of the FTL. Once a segment is cleaned and designated freed, data may be written sequentially is to that segment. Accounting structures, e.g., free segment maps indicating an amount of segment free space, maintained by the extent store layer for write allocation, may be employed by the segment cleaning process. Notably, selection of a clean segment to receive data (i.e., writes) from a segment being cleaned may be based upon the amount of free space remaining in the clean segment and/or the last time the clean segment was used. Note further that different portions of data from the segment being cleaned may be moved to different "target" segments. That is, a plurality of relatively clean segments 650b,c may receive differing portions of data from the segment 650a being cleaned.

Illustratively, segment cleaning may cause some write amplification in the storage array (SSDs). However, the file system may reduce such write amplification by writing extents to the SSDs sequentially as a log device. For example, given SSDs with an erase block size of approximately 2 MBs, by writing at least 2 MB of data (extents) sequentially to a free segment, an entire erase block may be overwritten and fragmentation at the SSD level may be eliminated (i.e., reducing garbage collection in the SSD). Yet, the SSDs typically stripe data across multiple flash components and across multiple channels (i.e., storage controllers 240) in order to realize performance. Thus, a relatively large (e.g., 2 GB) write granularity to a free (i.e., clean) segment may be necessary to avoid write amplification at the SSD level (i.e., to override internal SSD striping).

Specifically because the erase block boundaries in the SSD may be unknown, the write granularity should be large enough so that a sequence of writes for extents over a large contiguous range may overwrite previously written extents on the SSD and effectively override garbage collection in the SSDs. In other words, such garbage collection may be preempted because the new data is written over the same range as previous data such that the new data completely overwrites the previously written data. This approach also avoids consuming the reserve space capacity with the new write data. Accordingly, an advantage of the log-structured feature of the storage I/O stack (i.e., log-structured layer of the file system) is the ability to reduce write amplification of the SSDs with only a minimum amount of reserve space in the SSDs. This log-structured feature effectively "moves" flash device management of reserve space from the SSD to the is extent store layer, which uses that reserve space to manage the write amplification. Thus, instead of having two sources of write amplification (i.e., the extent store layer and the SSD FTL, which multiply) there is only one source of write amplification (i.e., the extent store layer).

Write Allocation

In an embodiment, there may be multiple RAID stripes per segment. Each time a segment is allocated, i.e., after cleaning the segment, the chunks of various SSDs within the segment may include a series of RAID stripes. The chunks may be at the same or different offsets within the SSDs. The extent store layer may read the chunks sequentially for cleaning purposes and relocate all the valid data to another segment. Thereafter, the chunks 620 of the cleaned segment may be freed and a decision may be rendered as to how to constitute the next segment that uses the chunks. For example, if a SSD is removed from a RAID group, a portion (i.e., a set of chunks 620) of capacity may be omitted from the next segment (i.e., change in RAID stripe configuration) so as to constitute the RAID group from a plurality of chunks 620 that is one chunk narrower, i.e., making the RAID width one less. Thus, by using segment cleaning, a RAID group of the chunks 620 constituting the segments may be effectively created each time a new segment is allocated, i.e., a RAID group is created dynamically from available SSDs when a new segment is allocated. There is generally no requirement to include all of the SSDs 260 in the storage array 150 in the new segment. Alternatively, a chunk 620 from a newly introduced SSD can be added into a RAID group created when a new segment 650 is allocated.

Figure 7:
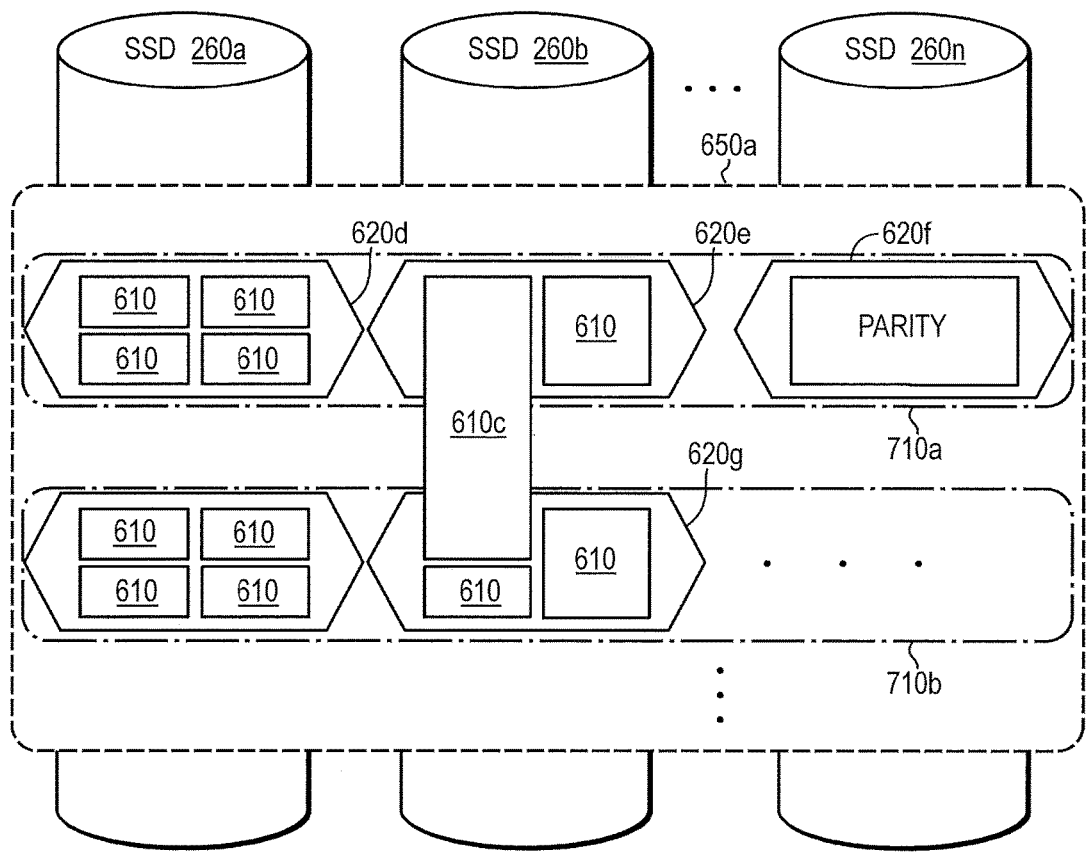
FIG. 7 illustrates a RAID stripe formed by the layered file system.

FIG. 7 illustrates a RAID stripe formed by the layered file system. As noted, write allocation may include gathering of the variable-length extents to form one or more stripes across SSDs of one or more RAID groups. In an embodiment, the RAID layer 360 may manage parity computations and topology information used for placement of the extents 610 on the SSDs 260a-n of the RAID group 466. To that end, the RAID layer may cooperate with the extent store layer to organize the extents as stripes 710 within the RAID group. Illustratively, the extent store layer may gather the extents 610 to form one or more full stripes 710 that may be written to a free segment 650a such that a single stripe write operation 458 may span all SSDs in that RAID group. The extent store layer may also cooperate with the RAID layer to pack each stripe 710 as a full stripe of variable-length extents 610. Once the stripe is complete, the RAID layer may pass the full stripe 710 of extents as a set of chunks 620d-f to the storage layer 365 of the storage I/O stack for storage on the SSDs 260. By writing a full stripe (i.e., data and parity) to the free segment, the layered file system avoids the cost of parity updates and spreads any required read operation load across the SSDs. Notably, the extents 610 pending a write operation on an SSD 260 may be accumulated into a chunk 620d,e, which is written as one or more temporally proximate write operations to the SSD (e.g., as 2 Gbytes), thereby reducing the performance impact of the FTL in the SSD.

In an embodiment, an extent store may be viewed as a global pool of extents stored on the storage arrays 150 of the cluster, where each extent may be maintained within a RAID group 466 of an extent store instance. Assume one or more variable-length (i.e., small and/or large) extents are written to a segment. The extent store layer may gather the variable-length extents to form one or more stripes across the SSDs of the RAID group. Although each stripe may include multiple extents 610 and an extent 610c could span more than one stripe 710a,b, each extent is entirely stored on one SSD. In an embodiment, a stripe may have a depth of 16 KB and an extent may have a size of 4 KB, but the extent may thereafter be compressed down to 1 or 2 KB or smaller permitting a larger extent to be packed which may exceed the stripe depth (i.e., the chunk 620g depth). Thus, a stripe may constitute only part of the extent, so the depth of the stripe 710 (i.e., the set of chunks 620d-f constituting the stripe) may be independent of the extent(s) written to any one SSD. Since the extent store layer may write the extents as full stripes across one or more free segments of the SSDs, write amplification associated with processing information of the stripes may be reduced.

Optimized Segment Cleaning Technique

The embodiments described herein are directed to an optimized segment cleaning technique configured to efficiently clean one or more selected portions or segments of a storage array coupled to one or more nodes of a cluster. As noted, the extent store layer 350 provides sequential storage of data and metadata on the SSDs 260 of the storage array 150. The metadata may include mappings of the extent keys to locations of the extents stored on the SSDs, which mappings are illustratively extent metadata organized as entries of the in-core hash tables 480 and other metadata data structures of the one or more nodes. For example, 58 GB of extent metadata may be employed to describe locations of extents stored on 10 TB of usable storage (e.g., 22 data SSDs and 2 parity SSDs). Such extent metadata may be organized as the in-core hash tables 480, e.g., cuckoo hash tables. In addition, there may be extents relating to metadata (e.g., checkpoints) of the hash tables themselves that are not described by the hash tables; the locations of these extents may be described by entries of other in-core metadata data structures, i.e., metadata tables, and recorded on SSD. For instance, the extent metadata of the hash tables are themselves embodied as pages and written as extents on SSD (e.g., as checkpoints), while changes to the hash tables (i.e., extent metadata) also accumulate in extent store layer log 355 and are written as extents on SSD.

Figure 8:
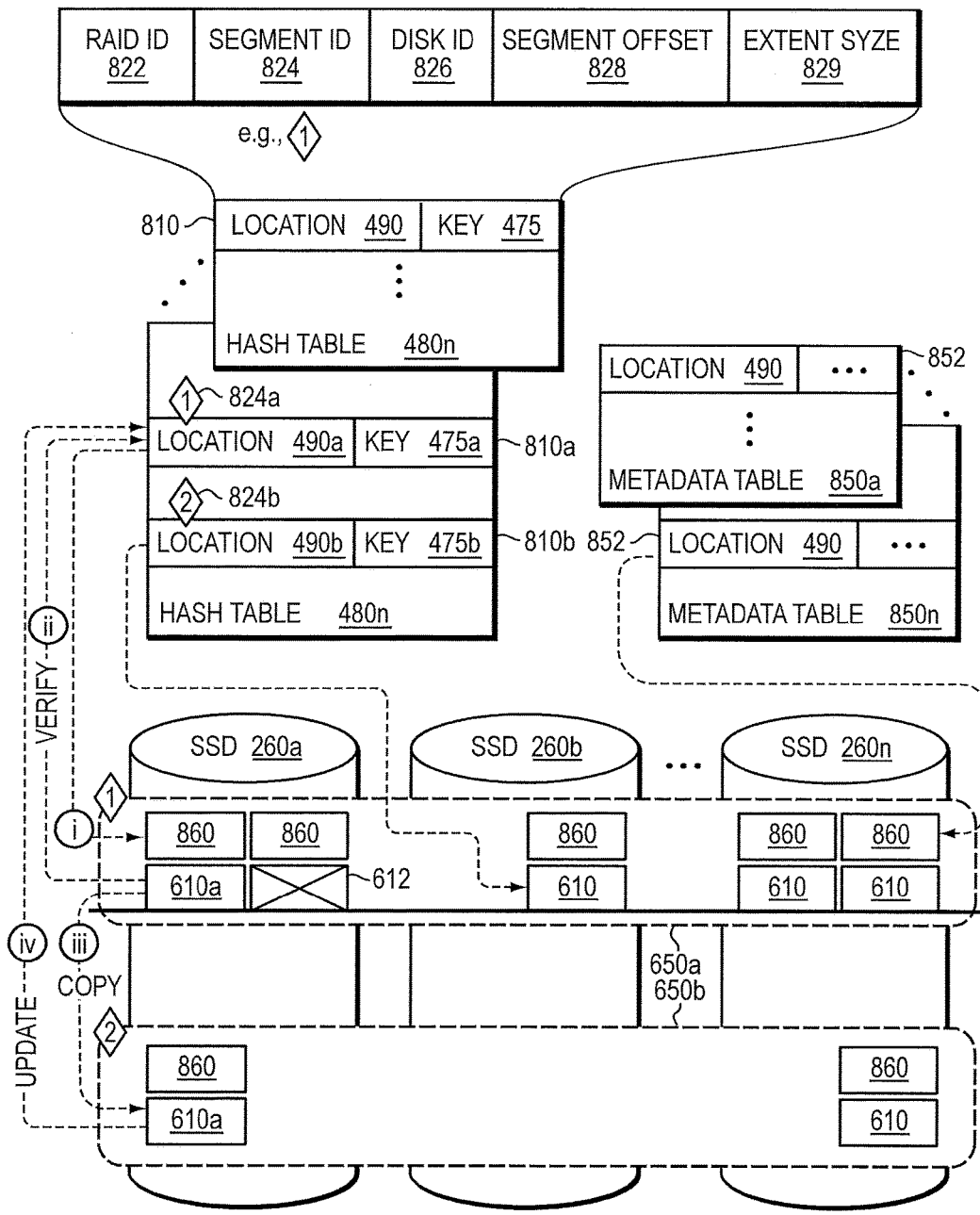
FIG. 8 illustrates extent location metadata and a bottom-up approach of an optimized segment cleaning technique.

FIG. 8 illustrates extent location metadata and a bottom-up approach to the optimized segment cleaning technique. Illustratively, each entry 810 of the hash tables 480 and each entry 852 of the metadata tables 850 describe a mapping of an extent key to a location 490 of a most recent version of a corresponding extent on SSD. Accordingly, every extent described in the tables is a valid extent, i.e., in-use. Notably the location provides sufficient information to retrieve (i.e., read) the extent from SSD. The optimized segment cleaning technique may be configured to search the entries 810 of the hash tables 480 as well as entries 852 of the metadata tables 850 storing extent metadata for the checkpoints and logs of the hash tables to identify locations of the extents within one or more segments to be cleaned. The location 490 of each extent illustratively includes a segment identifier (ID) 824 of a segment containing a most recent version of the extent. In an embodiment, the location 490 of the most recent version of the extent may include, inter alia, (i) 1-bit that identifies the RAID group (i.e., RAID ID 822) containing the extent, (ii) 13-bits that identify the segment (i.e., segment ID 824) containing the extent, (iii) 5-bits that identify the data SSD (i.e., disk ID 826) within the RAID group containing the extent, (iv) 21-bits that identify the offset of a block of the segment (i.e., segment offset 828) containing the extent (e.g., a first byte of a header of the extent), and (v) 8-bits that identify a number of standard-sized blocks (e.g., 512 bytes) consumed by the extent (i.e., extent size 829).

In an embodiment, the extent store layer maintains accounting structures, e.g., free segment maps indicating an amount of segment free space, as well as other data structures having information on heuristics and policies, which are illustratively employed by the segment cleaning process to determine the segment ID of the segment to be cleaned (i.e., the old segment). Accordingly, a segment is selected for cleaning based on a policy (e.g., exceeding a free space threshold, such as 25%) and cleaned according to a segment cleaning technique, illustratively: (i) the bottom-up approach, (ii) a top-down approach, or (iii) a hybrid approach. Illustratively, selection of the segment cleaning technique may be determined based on examining the accounting structures associated with the segment selected for cleaning.

In an embodiment, the bottom-up approach of the segment cleaning technique is configured to read all blocks of a segment 650a to be cleaned (i.e., an "old" segment) to locate the extents 610 stored on the SSDs of the segment and examine the extent metadata to determine whether the extents are valid. Illustratively, the segment cleaning process may cooperate with the RAID layer 360 to perform successive full stripe read operations beginning at the start of the old segment and proceeding to its end. Each extent stored on SSD is self-describing; that is, the extent includes an extent header 860 containing information describing the extent, e.g., an extent key and a length (in bytes) (not shown) consumed by the extent on SSD. The segment cleaning process of the extent store layer uses the extent key of each extent to find (e.g., index) the extent metadata entry 810, 852 in the in-core hash tables 480 and metadata tables 850a-n, respectively, corresponding to the extent key for each extent to determine a segment ID of a segment containing the most recent version of the extent 610a. Notably, the extent metadata selection technique 460 may be used to rapidly find (i.e., index) the hash table entry 810a corresponding to the extent. If the segment ID 824a (e.g., "1") of a location 490a in an entry 810a matches the segment ID (e.g., "1") of the old segment 650a, the extent referenced by the extent key 475a is determined to be valid (i.e., the most recent version) and is copied (relocated) to a segment 650b being written (i.e., a "new" segment). The segment cleaning process may then update the location 490a in the hash table (or metadata table) entry 810a to refer to the new location of the extent 610a in the new segment 650b. If, however, the segment ID 824b (e.g., "2") of the entry does not match the segment ID (e.g., "1") of the old segment 650a (or no hash table entry 810 exists for the extent key), then the extent referenced by the extent key 475b is not the most recent version (i.e., is determined to be invalid) and can be overwritten. Note that a failure to match any other part of the location (i.e., RAID ID 822, disk ID 826, and segment offset 828) indicates the extent is invalid. Accordingly, each part of the location (i.e., RAID ID, disk ID, and segment offset) of the entry may be matched to corresponding information associated with the extent, to determine whether the extent is valid. Thus, the bottom-up approach is configured to read the extent header 860 of every extent 610 on the old segment 650a to determine whether the extent is valid (i.e., data/metadata is in-use) and, if so, relocates (copies) the extent to the new segment to preserve the valid data/metadata while consolidating the space occupied by invalid extents 612 (e.g., deleted extents). Once all of the valid data/metadata has been relocated, the entire old segment may then be safely reused.

In an embodiment, the top-down approach of the optimized segment cleaning technique obviates reading of the blocks of the old segment to locate the extents and, instead, examines the in-core extent metadata (i.e., hash table and metadata table entries) to determine the valid extents of the old segment to be cleaned. This approach of the segment cleaning technique takes into consideration that the old segment may have been relatively full with valid extents at one time, but before cleaning, some of those extents may have been logically overwritten, i.e., to a same LBA range, leaving the overwritten extent as stale data on the segment. Therefore, the logically overwritten extents, i.e., invalid extents, do not have to be copied (relocated). Thus for I/O workloads having access patterns that frequently overwrite data, the top-down approach may be effective is since it reads and relocates only valid extents of blocks in a segment. In contrast, the bottom-up approach reads valid and invalid extents from the old segment and then verifies whether the extent read is valid.

Figure 9A:
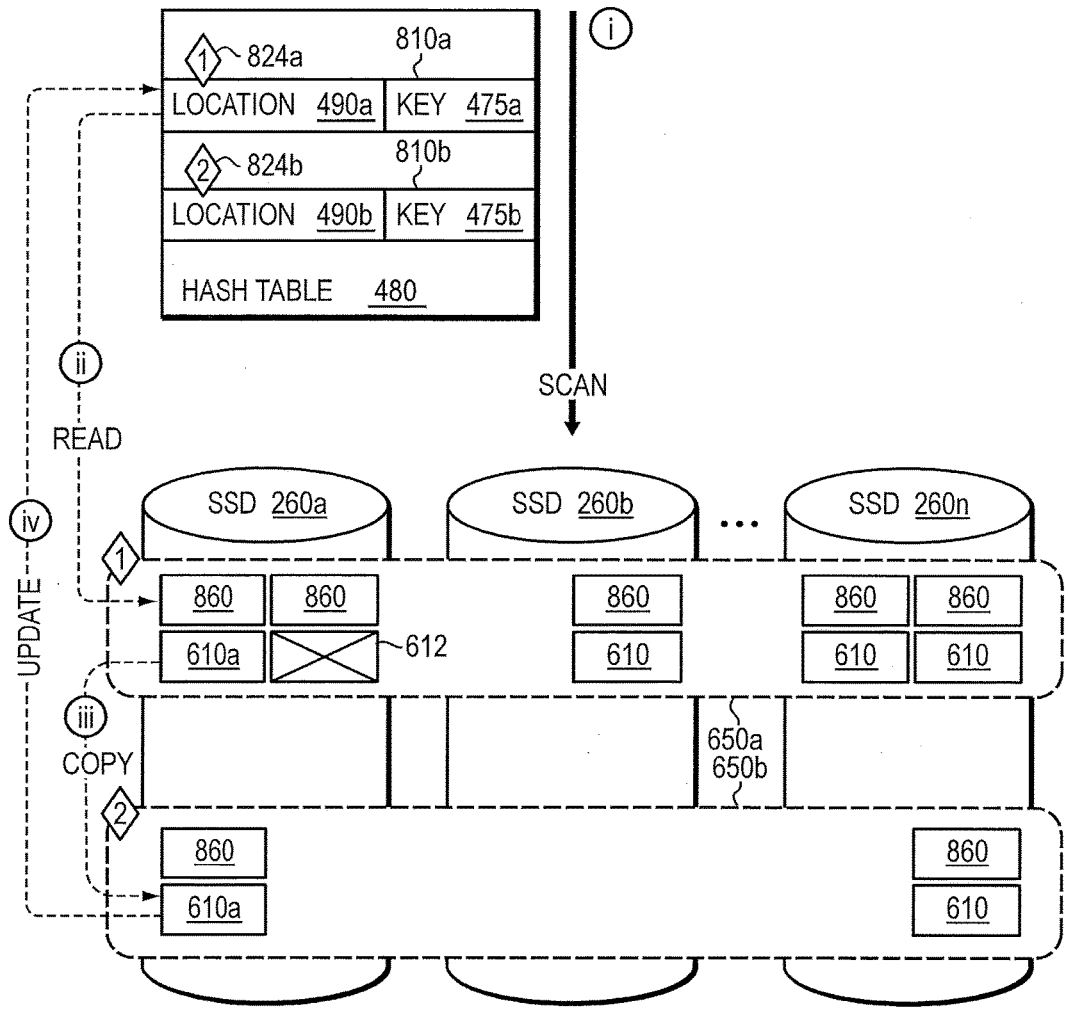
FIG. 9a illustrates a top-down approach of the optimized segment cleaning technique.

FIG. 9a illustrates the top-down approach to the optimized segment cleaning technique. Illustratively, the segment cleaning process scans entries of the in-core hash tables 480 and metadata tables 820 to find respective entries 810a,b and 852 matching the segment ID of the segment selected for cleaning. As noted, the extent metadata (e.g., locations 490) of the entries include references to the most recent versions of the extents; accordingly, any valid extents 610a of the old segment 650a that need to be relocated may be identified and copied to the new segment 650b. In other words, an invalid (e.g., deleted) extent 612 is not read as it need not be relocated. The segment cleaning process may then update the location 490a of the entry 810a to refer to the new location of the extent 610a in the new segment 650b. Unlike the bottom-up approach that may read both valid (i.e., in-use) and invalid (e.g., deleted) extents in a segment and then verify validity of the extent read, the top-down approach avoids reading invalid extents from the segment. That is, the bottom-up approach is driven by extents on SSD, whereas the top-down approach is driven by valid extents associated with entries in the in-core hash tables and metadata tables. Generally, the bottom-up approach is more efficient for segments that are relatively full (i.e., exceed a capacity threshold), while the top-down approach is more efficient for segments that are relatively empty (i.e., below a capacity threshold).

Figure 9B:
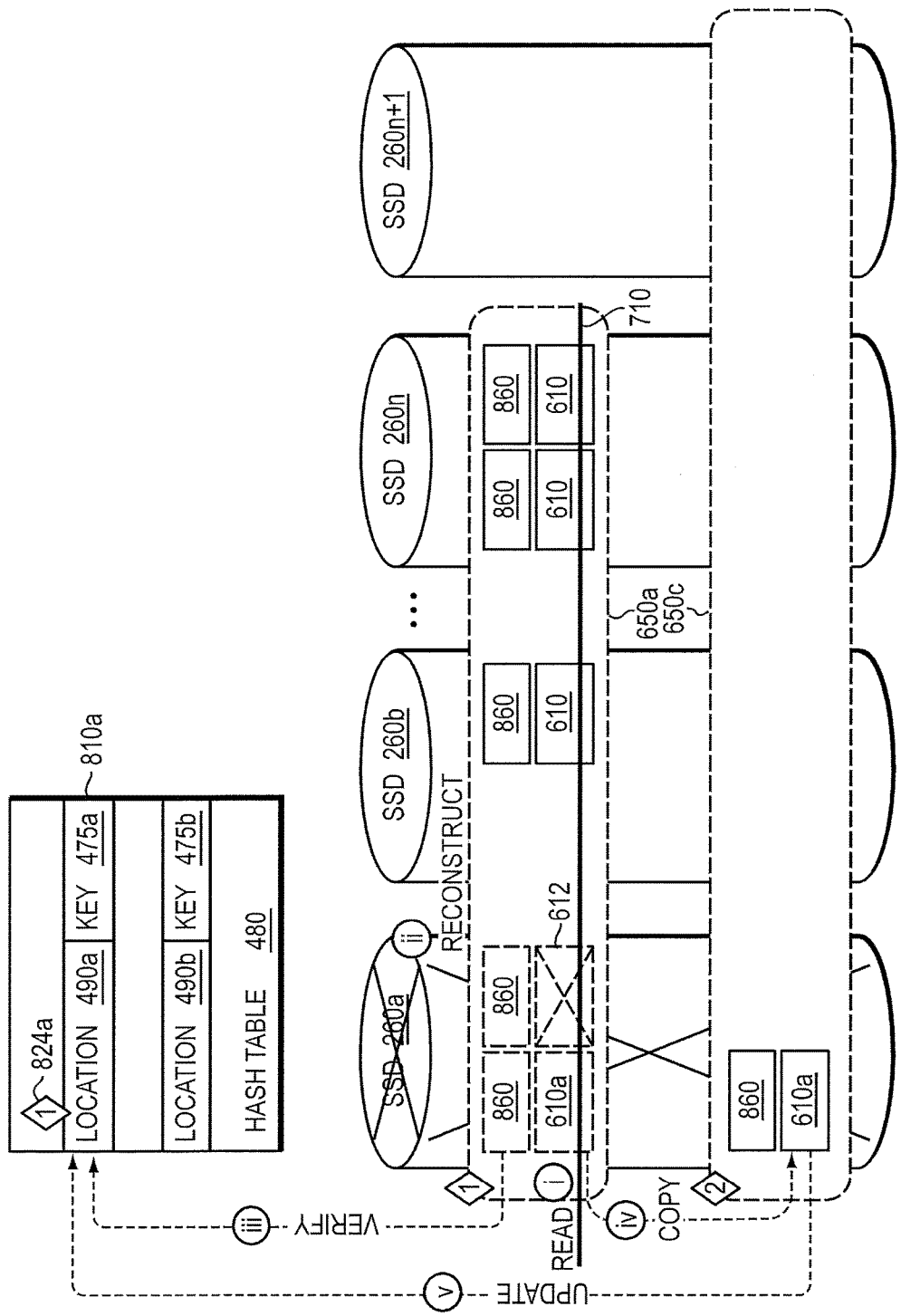
FIG. 9b illustrates the approaches of the optimized segment cleaning technique during a storage device failure.

FIG. 9b illustrates the approaches of the optimized segment cleaning technique during a storage device failure. Assume that in response to a missing (e.g., failed, inaccessible, or otherwise unavailable) SSD 260a of a RAID group, a new SSD 260n+1 is added to the RAID group and the data (e.g., valid extent 610a and invalid extent 612) of the inaccessible SSD is reconstructed and its validity verified prior to storage on a new segment 650c. Using the bottom-up approach, every stripe 710 of the RAID group may be read (via a full stripe read operation), and the missing data (e.g., valid extent 610a and invalid extent 612 on the inaccessible SSD 260a) may be reconstructed and verified prior to being written to corresponding locations on the new segment 650c. Using the top-down approach, the in-core hash tables and metadata tables may be scanned searching for valid extents with locations to the segment to be cleaned, including the missing SSD. Thereafter, only those extents found in the scan (i.e., valid extent 610a) need to be reconstructed; notably, there is no need to reconstruct data on the missing SSD that was overwritten or deleted (e.g., invalid extent 612). Notably, multiple reconstructions of data may occur when a plurality of extents on a missing SSD need relocation.

In an embodiment, the hybrid approach of the segment cleaning technique is configured to further reduce reading of blocks of the old segment, especially for compressed blocks sharing extents, such that each block is read only once. As noted previously, the log-structured layout employed by the extent store layer allows unrestricted compression of extents prior to storage on SSD. For example, a 4 KB extent of data may be compressed to a 2 KB extent, such that not all of the 4 KB of a block on SSD is consumed; instead, another 2 KB extent may be packed immediately adjacent to the compressed 2 KB extent, e.g., on the same 4 KB block. Yet, if the two extents were read separately, the same block on SSD may be read twice, i.e., once for each extent using either the top-down or bottom-up approach for segment cleaning. The hybrid approach, however, is configured to avoid such redundancy since the need to read a block twice to relocate information from different extents that share the same block increases both read and write amplification. To that end, the hybrid approach may be configured to perform an occasional full stripe read operation, particularly in the event of reconstructing missing blocks (data and/or metadata) from a missing or inaccessible SSD.

Accordingly, the hybrid approach uses the top-down approach to determine the segment ID of the old segment, scan the entries of the in-core hash tables and metadata tables to find matches to the segment ID, and identify the valid extents of the old segment that need to be relocated to the new segment. A relocation list may be created, e.g., by the segment cleaning process, which identifies the blocks of the valid extents of the old segment that need to be read (and relocated) and any blocks that need to be read on accessible (missing) SSDs to satisfy the reconstruction of the missing blocks of the missing SSD. The segment cleaning process may then sort the blocks (extents) by SSD location (e.g., ladder sort by storage device offset) according to read operations required for the blocks of the extents to be relocated, and then i) combine one or more adjacent locations into a single larger read operation; and ii) coalesce any redundant location references to blocks, e.g., two read operations needed to relocate two valid extents that share a common block on SSD may be coalesced to one read operation of the common block. Upon sorting and coalescing the list, a reduced (ideally minimal) number of read operations may be determined to relocate blocks and optimize segment cleaning.

In an embodiment, there are a number of types (e.g., 5 types) of extents, each of which specifies an in-core table type (i.e., hash table or metadata table) to scan to determine whether the extent of the old segment is valid, i.e., whether the old segment stores the most recent version of the extent. When the extent of the old segment to be cleaned is found using the bottom-up approach, the extent header of the extent is read to determine the type of extent and, thus where to look (i.e., which type of table) for the metadata (i.e., location metadata) describing the extent. In contrast, the top-down and hybrid approaches scan each of the in-core tables. Note that when cleaning more than one segment at a time, the in-core tables may be scanned entry-by-entry for each segment being cleaned to search for valid extents in all of the segments being cleaned.

Advantageously, the bottom-up approach may be employed when the SSDs of the old segment (i.e., to be cleaned) are relatively full (i.e., exceeding a capacity threshold) with valid extents (blocks) to leverage full stripe read operations to reduce SSD accesses for a read path of the storage I/O stack. As noted, the segment cleaning process cooperates with the RAID layer to illustratively read the entire old segment using full stripe read operations to relocate the valid extents from the old segment to the new segment being written. Performance of full stripe read operations also obviates the need for extra read operations when reconstructing data in response to a missing SSD of a RAID group, e.g., the missing data of the missing SSD may be constructed by the RAID layer using XOR operations once per read operation regardless of the number of extents being read.

In contrast, the top-down approach may be employed when i) an SSD is inaccessible (i.e., missing or fails); and ii) the SSDs of the segment are relatively empty (i.e., below a capacity threshold with respect to valid extents) because it is only necessary to read a portion of the blocks in the old segment to access those valid extents, as opposed to reading all of the blocks of the segment, thereby reducing read and write amplification. Unlike the bottom-up approach, the top-down approach generally does not perform full stripe read operations unless to reconstruct data from a missing SSD. The hybrid approach may be employed to extend the top-down approach to include only full stripe read operations needed for relocation and reconstruction of blocks, while also avoiding any unnecessary read operations of invalid extents carried out in the bottom-down approach and redundant reads for reconstruction carried out in the top-down approach. Notably, after performing a full stripe read operation, the hybrid approach may directly retrieve any valid extents from the stripe using, e.g., the segment offsets obtained from scanning the hash tables.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
receiving a write request directed towards a logical unit (LUN), the write request having data and processed at a node of a cluster, the node having a processor, a memory and connected to a storage array of solid state drives (SSDs);
generating a first key from the data;
storing the data as a first extent in a first segment according to a log-structured layout, the first segment spanning a set of the SSDs, the first segment associated with a first segment identifier (ID), the first extent including the first key;
using an in-core metadata table to determine whether the first extent is valid when the first segment is above a capacity threshold;
reading the first extent from the first segment to determine whether the first extent is valid when the first segment is below the capacity threshold;
in response to determining that the first extent is valid, cleaning the first segment by copying the first extent from the first segment to a second segment, the second segment having the log-structured layout and associated with a second segment ID different than the first segment ID; and
updating an entry of the in-core metadata table to include the second segment ID, the entry including the first key.

2. The method of claim 1 wherein cleaning the first segment further comprises:
copying the first extent from a first location of the first segment to a second location of the second segment.

3. The method of claim 2 further comprising:
in response to determining that the first extent is valid, updating the entry to include the second location.

4. The method of claim 1 further comprising:
finding the entry of the in-core metadata table using the first key; and
using the entry to determine whether the first extent is valid.

5. The method of claim 1 further comprising:
examining metadata of the first extent read from the first segment;

finding the entry of the in-core metadata table using the first key of the first extent, the entry having an entry segment ID;
matching the entry segment ID to the first segment ID of the first segment; and
in response to matching the entry segment ID to first segment ID of the first segment, copying the first extent to the second segment.

6. The method of claim 1 further comprising:
scanning the in-core metadata table using the first segment ID to find the entry, the entry having the first segment ID and the first key;
copying the first extent from a first location of the first segment to a second location of the second segment; and
updating the entry to include the second location.

7. The method of claim 1 wherein a first approach to segment cleaning is used when a SSD of the set of the SSDs is inaccessible, wherein a second approach to segment cleaning is used when the first segment is below the capacity threshold, wherein the first approach to segment cleaning reads all extents included in the first segment, and wherein the second approach to segment cleaning reads only valid extents included in the first segment.

8. The method of claim 1 further comprising:
reading a block of the first segment as a stripe read operation spanning the set of the SSDs of the first segment, wherein the first extent and a second extent are included in the block of the first segment, wherein the first extent is compressed, and wherein a first location of the first extent equals a second location of the second extent.

9. The method of claim 1 further comprising:
coalescing reading of a first location of the first extent with a second location of a second extent, wherein the first extent and the second extent are included in a block of the first segment.

10. A method comprising:
receiving a write request directed towards a logical unit (LUN), the write request having data and processed at a node of a cluster, the node having a memory and connected to a storage array of solid state drives (SSDs);
associating the data with a first key;
storing the data as a first extent in a first segment according to a log-structured layout, the first segment spanning a set of the SSDs, the first segment associated with a first segment identifier (ID), the first extent including the first key;
scanning an in-core metadata table using the first segment ID to find an entry to determine whether the first extent is valid when the first segment is above a capacity threshold, the entry having the first segment ID and the first key;
reading the first extent from the first segment to determine whether the first extent is valid when the first segment is below the capacity threshold;
in response to determining that the first extent is valid, copying the first extent from the first segment to a location on a second segment, the second segment having the log-structured layout and associated with a second segment ID different than the first segment ID; and
updating the entry of the in-core metadata table to include the second segment ID and the location.

11. A system comprising:
a storage system having a memory connected to a processor;
a storage array coupled to the storage system having one or more solid state drives (SSDs);
a storage I/O stack executing on the processor of the storage system, the storage I/O stack configured to:
receive a write request directed towards a logical unit (LUN), the write request having data;
generate a first key from the data;
store the data as a first extent in a first segment according to a log-structured layout, the first segment spanning a set of the SSDs, the first segment associated with a first segment identifier (ID), the first extent including the first key;
use an in-core metadata table to determine whether the first extent is valid when the first segment is above a capacity threshold;
read the first extent from the first segment to determine whether the first extent is valid when the first segment is below the capacity threshold;
in response to determining that the first extent is valid, clean the first segment by copying the first extent from the first segment to a second segment, the second segment having the log-structured layout and associated with a second segment ID different than the first segment ID; and
update an entry of the in-core metadata table to include the second segment ID, the entry including the first key.

12. The system of claim 11 wherein the storage I/O stack configured to clean the first segment is further configured to:
copy the first extent from a first location to a second location.

13. The system of claim 11 wherein the storage I/O stack is further configured to:
find the entry of the in-core metadata table using the first key; and
use the entry to determine whether the first extent is valid.

14. The system of claim 12 wherein the storage I/O stack is further configured to:
in response to determining that the first extent is valid, update the entry to include the second location.

15. The system of claim 11 wherein the storage I/O stack is further configured to:
examine metadata of the first extent read from the first segment;
find the entry of the in-core metadata table using the first key of the first extent, the entry having an entry segment ID;
match the entry segment ID to the first segment ID of the first segment; and
in response to matching the entry segment ID to the first segment ID of the first segment, copy the first extent to the second segment.

16. The system of claim 11 wherein the storage I/O stack is further configured to:
scan the in-core metadata table using the first segment ID to find the entry, the entry having the first segment ID and the first key;
copy the first extent from a first location to a second location; and
update the entry to include the second location.

17. The system of claim 11 wherein a first approach to segment cleaning is used when a SSD of the set of the SSDs is inaccessible, wherein a second approach to segment cleaning is used when the first segment is below the capacity threshold, wherein the first approach to segment cleaning reads all extents included in the first segment, and wherein the second approach to segment cleaning reads only valid extents included in the first segment.

18. The system of claim 11 wherein the storage I/O stack is further configured to:
   read a block of the first segment as a full stripe read operation spanning the set of the SSDs of the first segment, wherein the first extent and a second extent are included in the block of the first segment, wherein the first extent is compressed, and wherein a first location of the first extent equals a second location of the second extent.

19. The system of claim 18 wherein the full stripe read operation occurs in response to a failed SSD of the set of the SSDs of the first segment.

20. The system of claim 11 wherein the storage I/O stack is further configured to:
   coalesce reading of a first location of the first extent with a second location of a second extent, wherein the first extent and the second extent are included in a block of the first segment.

* * * * *